United States Patent
Becker et al.

(10) Patent No.: US 12,225,900 B2
(45) Date of Patent: Feb. 18, 2025

(54) PERFUSION LOOP ASSEMBLY FOR AN EX-VIVO LIVER PERFUSION AND A METHOD FOR EX-VIVO LIVER PERFUSION

(71) Applicants: ETH Zurich, Zurich (CH); Universität Zurich, Zurich (CH)

(72) Inventors: Dustin Becker, Zurich (CH); Dilmurodjon Eshmuminov, Rudolfstetten (CH); Max Leo Hefti, Zurich (CH); Martin Jörg Schuler, Zurich (CH); Philipp Rudolf von Rohr, Basel (CH); Pierre-Alain Clavien, Kilchberg (CH); Rolf Graf, Zurich (CH); Lucia Bautista Borrego, Zurich (CH); Xavier Muller, Zurich (CH); Philipp Dutkowski, Zurich Zurich (CH)

(73) Assignees: ETH Zurich, Zurich (CH); Universität Zurich, Zurich (CH)

( * ) Notice: Subject to any disclaimer, the term of this patent is extended or adjusted under 35 U.S.C. 154(b) by 1252 days.

(21) Appl. No.: 16/962,531

(22) PCT Filed: Jan. 18, 2019

(86) PCT No.: PCT/EP2019/051252
§ 371 (c)(1),
(2) Date: Jul. 16, 2020

(87) PCT Pub. No.: WO2019/141809
PCT Pub. Date: Jul. 25, 2019

(65) Prior Publication Data
US 2020/0375178 A1    Dec. 3, 2020

(30) Foreign Application Priority Data

Jan. 19, 2018 (EP) ..................................... 18152562
Apr. 26, 2018 (EP) ..................................... 18169518
Nov. 6, 2018 (EP) ..................................... 18204583

(51) Int. Cl.
*A01N 1/02*    (2006.01)

(52) U.S. Cl.
CPC ......... *A01N 1/0247* (2013.01); *A01N 1/0215* (2013.01); *A01N 1/0226* (2013.01)

(58) Field of Classification Search
None
See application file for complete search history.

(56) References Cited

U.S. PATENT DOCUMENTS

| 3,515,370 A | 6/1970 | Jester et al. |
| 4,192,308 A | 3/1980 | Michaels |

(Continued)

FOREIGN PATENT DOCUMENTS

| CN | 1543785 A | 11/2004 |
| CN | 103719075 A | 4/2014 |

(Continued)

OTHER PUBLICATIONS

Ravikumar et al. "Normothermic liver preservation: a new paradigm?," Transplant International, 28 (2015) 690-699. (Year: 2015).*

(Continued)

*Primary Examiner* — William H. Beisner
(74) *Attorney, Agent, or Firm* — The Webb Law Firm

(57) ABSTRACT

A perfusion loop assembly for ex vivo liver perfusion includes a pump providing perfusion fluid through a line branching at a branching point into a first branch line and a second branch line. The first branch line provides a first portion of the perfusion fluid to the hepatic artery of the liver, the first branch line coupled with a gas exchanger, where the first branch line includes a flow rate sensor and/or a pressure sensor. The second branch line provides a second portion of the perfusion fluid to the portal vein of the liver; the second branch line includes a valve for controlling flow of perfusion fluid into the portal vein. The second branch line includes a flow rate sensor and/or a pressure sensor. A liver chamber assembly holds the liver ex vivo, and an outlet line for the perfusion fluid connects the liver chamber assembly and the pump.

8 Claims, 14 Drawing Sheets

(56) References Cited

U.S. PATENT DOCUMENTS

Figure 1A:
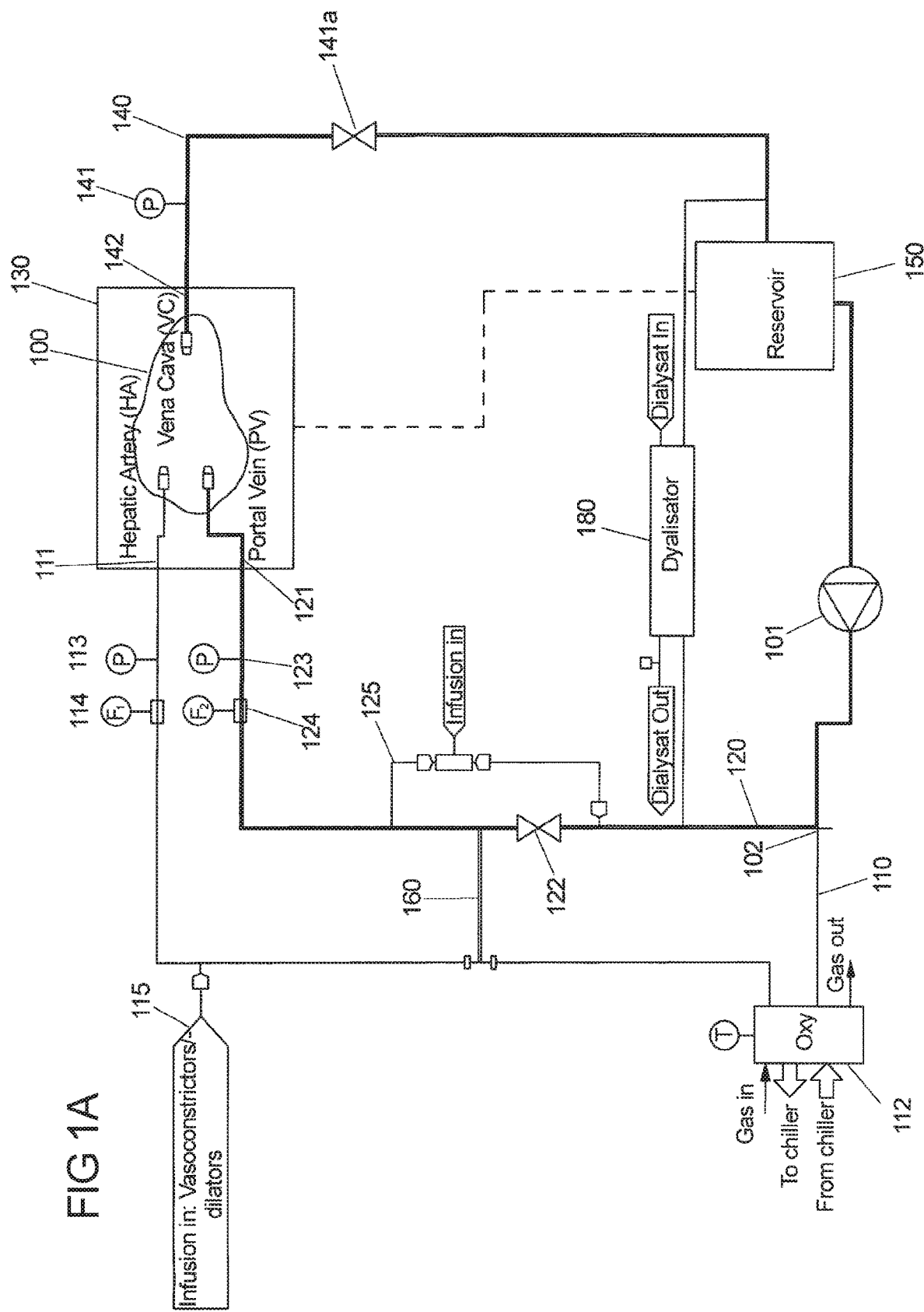

| | | |
|---|---|---|
| 5,141,847 A | 8/1992 | Sugimachi et al. |
| 5,786,136 A | 7/1998 | Mayer |
| 5,856,081 A | 1/1999 | Fahy |
| 5,890,518 A | 4/1999 | Fischerkeller |
| 7,410,474 B1 | 8/2008 | Friend et al. |
| 7,572,622 B2 | 8/2009 | Hassanein et al. |
| 7,811,808 B2 | 10/2010 | van der Plaats et al. |
| 7,977,042 B2 | 7/2011 | Lee et al. |
| 8,287,580 B2 | 10/2012 | Rakhorst et al. |
| 8,927,257 B2 | 1/2015 | Hutzenlaub et al. |
| 8,986,978 B2 | 3/2015 | Brassil |
| 9,457,179 B2 | 10/2016 | Hassanein et al. |
| 9,756,848 B2 | 9/2017 | van der Plaats et al. |
| 10,076,112 B2 | 9/2018 | Hassanein et al. |
| 10,362,780 B2 | 7/2019 | Kay et al. |
| 10,433,538 B2 | 10/2019 | Fontes et al. |
| 10,634,686 B2 | 4/2020 | Chaves Fontes et al. |
| 2004/0058432 A1* | 3/2004 | Owen .............. A01N 1/0273 435/284.1 |
| 2005/0147958 A1 | 7/2005 | Hassanein et al. |
| 2006/0148062 A1 | 7/2006 | Hassanein et al. |
| 2007/0009881 A1 | 1/2007 | Artz et al. |
| 2007/0048725 A1 | 3/2007 | Arrington |
| 2008/0017194 A1 | 1/2008 | Hassanein et al. |
| 2009/0197240 A1 | 8/2009 | Fishman et al. |
| 2010/0117011 A1 | 5/2010 | Kitano et al. |
| 2011/0065170 A1 | 3/2011 | Fondevila Campo et al. |
| 2012/0213798 A1 | 8/2012 | Levy et al. |
| 2013/0011823 A1 | 1/2013 | Hassanein et al. |
| 2013/0177972 A1 | 7/2013 | Green et al. |
| 2014/0011182 A1 | 1/2014 | Van Sickle et al. |
| 2014/0017658 A1 | 1/2014 | Steinman et al. |
| 2014/0017662 A1 | 1/2014 | Kravitz et al. |
| 2014/0308654 A1 | 10/2014 | Kay et al. |
| 2014/0377849 A1 | 12/2014 | Kay et al. |
| 2015/0004677 A1 | 1/2015 | Kay et al. |
| 2015/0173348 A1 | 6/2015 | Brasile |
| 2015/0342177 A1 | 12/2015 | Hassanein et al. |
| 2016/0262634 A1 | 9/2016 | Steen et al. |
| 2017/0339945 A1 | 11/2017 | Freed |
| 2019/0141988 A1 | 5/2019 | Kobayashi et al. |
| 2020/0253194 A1* | 8/2020 | Clavien ............. A01N 1/0247 |
| 2020/0375178 A1 | 12/2020 | Becker et al. |

FOREIGN PATENT DOCUMENTS

| | | | |
|---|---|---|---|
| CN | 105379707 A | 3/2016 | |
| CN | 205124849 U | 4/2016 | |
| CN | 105660604 A | 6/2016 | |
| CN | 206403020 U | 8/2017 | |
| CN | 214339668 U * | 10/2021 | ........... A01N 1/0247 |
| DE | 2603139 A1 | 8/1976 | |
| EP | 0702515 B1 | 12/1996 | |
| EP | 2133610 A1 | 12/2009 | |
| EP | 2633755 A1 | 9/2013 | |
| EP | 2009986 B1 | 4/2015 | |
| EP | 2203046 B1 | 5/2015 | |
| EP | 3459351 A1 | 3/2019 | |
| WO | WO-0200293 A1 * | 1/2002 | .............. A61M 1/36 |
| WO | WO-2005022995 A1 * | 3/2005 | .............. A01N 1/02 |
| WO | 2007014380 A2 | 2/2007 | |
| WO | 2008108996 A1 | 9/2008 | |
| WO | 2009138446 A2 | 11/2009 | |
| WO | 2011050459 A1 | 5/2011 | |
| WO | 2011062621 A2 | 5/2011 | |
| WO | 2013029044 A1 | 2/2013 | |
| WO | 2013032319 A1 | 3/2013 | |
| WO | WO-2013068753 A1 * | 5/2013 | ........... A01N 1/0247 |
| WO | 2014001592 A1 | 1/2014 | |
| WO | 2014059316 A1 | 4/2014 | |
| WO | 2015042602 A1 | 3/2015 | |
| WO | 2015187737 A1 | 12/2015 | |
| WO | 2016090498 A1 | 6/2016 | |
| WO | 2017200089 A1 | 11/2017 | |
| WO | 2018015548 A2 | 1/2018 | |
| WO | 2019141809 A1 | 7/2019 | |

OTHER PUBLICATIONS

Schön et al., Liver Transplantation After Organ Preservation with Normothermic Extracorporeal Perfusion, Ann. Surg., Jan. 2001, pp. 114-123, vol. 233, No. 1.

Barbas et al., "Ex-vivo liver perfusion for organ preservation: Recent advances in the field", Transplantation Reviews, 2016, pp. 154-160, vol. 30.

Boyer, "Bile Formation and Secretion", Compr Physiol, 2013, pp. 1035-1078, vol. 3.

Chapman et al., "Flavoprotein Protocols", Methods in Molecular Biology, 1999, vol. 131, Humana Press Inc., Totowa, NJ.

Chen et al., "Coalescence-Induced Jumping of Multiple Condensate Droplets on Hierarchical Superhydrophobic Surfaces", Sci. Rep, 2016, pp. 1-11, vol. 6:18649.

Chouchani et al., "Ischaemic accumulation of succinate controls reperfusion injury through mitochondrial ROS", Nature, 2014, pp. 431-435, vol. 515.

Dash et al., "Erratum to: Blood HbO2 and HbCO2 Dissociation Curves at Varied O2, CO2, pH, 2,3-DPG and Temperature Levels", Annals of Biomedical Engineering, 2010, pp. 1683-1701, vol. 38:4.

Fitzgerald et al., "Assessment of Renal Ischemia by Optical Spectroscopy", Journal of Surgical Research, 2004, pp. 21-28, vol. 122.

Golse et al., "Arterial Lactate Concentration at the End of Liver Transplantation is an Early Predictor of Primary Graft Dysfunction", Ann Surg, 2018, pp. 1-8.

Hoefeijzers et al., "The Pulsatile Perfusion Debate in Cardiac Surgery: Answers From the Microcirculation?", J. Cardiothorac. Vasc. Anesth., 2015, pp. 761-767, vol. 29:3.

Hohenester et al., "A Biliary HCO3-Umbrella Constitutes a Protective Mechanism Against Bile Acid-Induced Injury in Human Cholangiocytes," Hepatology, 2012, pp. 173-183, vol. 55:1.

Imber et al., "Optimisation of Bile Production during Normothermic Preservation of Porcine Livers", American Journal of Transplantation, 2002, pp. 593-599, vol. 2.

Imber et al., "Advantages of Normothermic Perfusion Over Cold Storage in Liver Preservation", Transplantation, 2002, pp. 701-709, vol. 73:5.

Jablonski et al., "Studies on the Isolated Perfused Pig Liver", Brit. J. Surg., 1971, pp. 129-137, vol. 58:2.

Kahl et al., "Critical Role of Flavin and Glutathione in Complex I-Mediated Bioenergetic Failure in Brain Ischemia/Reperfusion Injury", Stroke, 2018, pp. 1223-1231, vol. 49.

Kaiser et al., "Die Entwicklung eines leichten, automatisch gesteuerten Lappen-Containers zum Direkttransfer und zur warmen Langzeitkonservierung freier, mikrochirurgischer Lappen", European Archives of Oto-Rhino-Laryngology—Sitzungsbericht, 1994, pp. 276-277.

Kanno et al., "Regulation of cholangiocyte bicarbonate secretion", Am J Physiol Gastrointest Liver Physiol, 2001, vol. 281, pp. G612-G625.

Op Den Dries et al., "Ex vivo Normothermic Machine Perfusion and Viability Testing of Discarded Human Donor Livers", American Journal of Transplantation, 2013, pp. 1327-1335, vol. 13.

Ravikumar et al., "Normothermic liver preservation: a new paradigm?", Steunstichting ESOT, 2015, pp. 690-699, vol. 28.

Steinacher et al., "Therapeutic Mechanisms of Bile Acids and Nor-Ursodeoxycholic Acid in Non-Alcoholic Fatty Liver Disease", Dig Dis, 2017, pp. 282-287, vol. 35.

Trauner et al., "Potential of nor-Ursodeoxycholic Acid in Cholestatic and Metabolic Disorders", Dig Dis, 2015, pp. 433-439, vol. 33.

Vekemans et al., "Artificial Circulation of the Liver: Machine Perfusion as a Preservation Method in Liver Transplantation", The Anatomical Record, 2008, pp. 735-740, vol. 291.

* cited by examiner

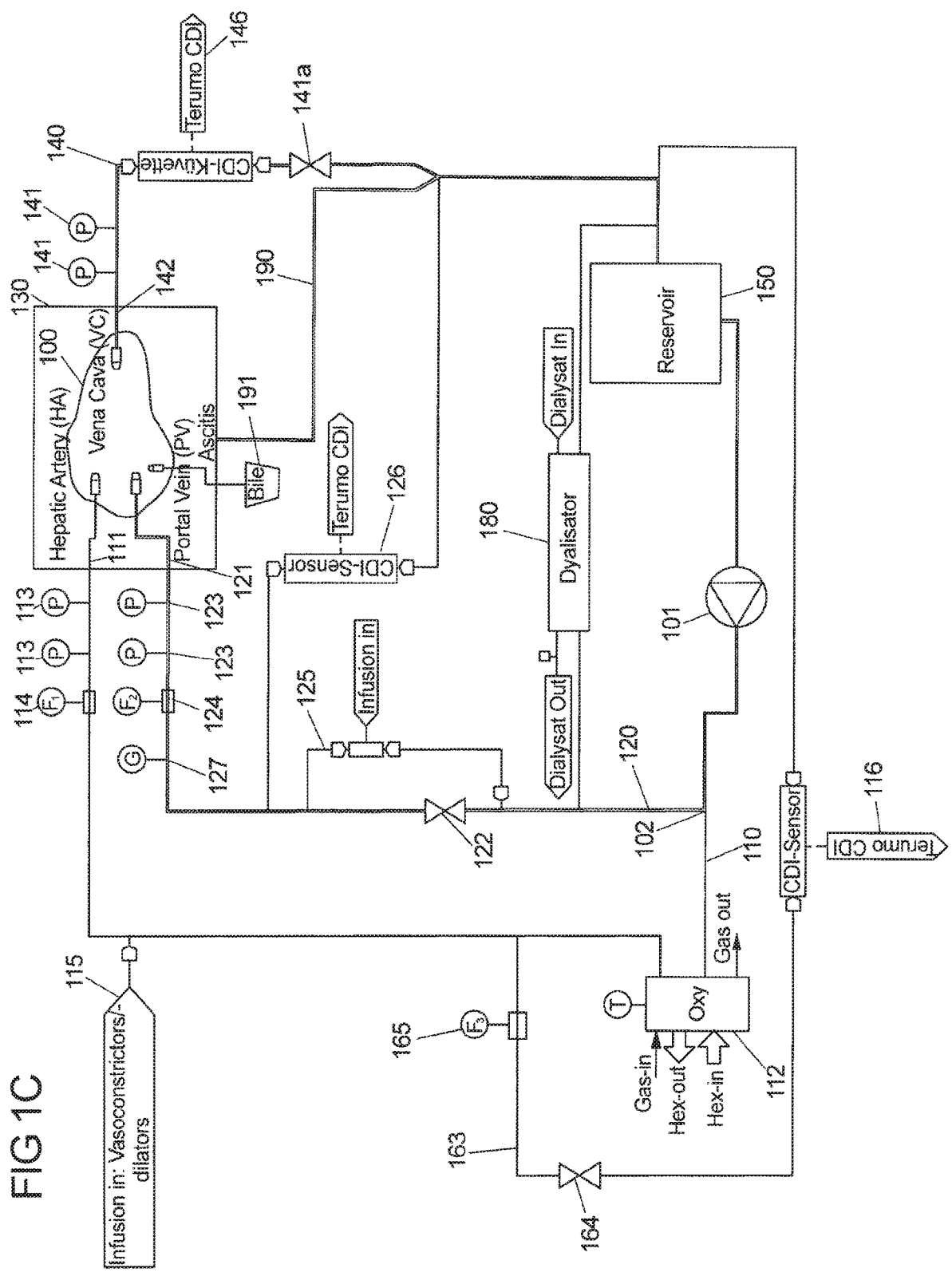

PERFUSION LOOP ASSEMBLY FOR AN EX-VIVO LIVER PERFUSION AND A METHOD FOR EX-VIVO LIVER PERFUSION

The invention relates to a perfusion loop assembly for an ex vivo (outside of the body) liver perfusion and a method for ex-vivo liver perfusion using said assembly.

Worldwide, over half a million new patients are diagnosed with primary cancer in the liver each year. Furthermore, the liver is the primary site of metastases for most cancers. The majority of those patients are incurable.

The concept that the liver has the ability to regenerate has been known for centuries. Liver resection (surgical removal of the diseased part of the liver) for the treatment of liver cancer has been carried out for a few decades.

However, many patients still cannot benefit from liver surgery because the removal of a too large piece of the liver leads to death (e.g. due to a small-for-size syndrome).

The organ donor pool shortage is increasing in western countries. New strategies are required to alleviate current donor organ shortage. The ability of the liver to regenerate could also be used in liver transplantation to increase the donor pool, where a healthy donor liver will be split into a couple of parts that will be grown in the perfusion machine and transplanted into more than one patient.

Perfusion systems are known from Ravikumar et. al. "Normothermic liver preservation: a new paradigm?", Steunstichting ESOT 28 (2015), 690-699, U.S. Pat. No. 7,410,474 B1, WO 2013/032319 A1 and WO 2015/187737 A1.

Generally, systems and methods are needed to extend the viability of tissue, namely that of solid organs (e.g. heart, lung, brain, uterus, kidney, genitals, liver, pancreas, intestine, liver) or of extremities (limb, hand, leg, foot) and face or of dermal tissue, outside of the body (ex vivo) and, in the case of liver and/or dermal tissue, allow its growth (e.g. enabling liver regeneration systems and methods). Such a system and method should be able to imitate the body and come close to the conditions within the real body (provide close to physiologic conditions, close to the in vivo conditions). Therefore, such a technology can be described as an artificial body.

It is an issue to provide a system and a method to extend the viability of the liver, outside of the body, ex vivo. Such a system would allow patients with formerly non-resectable livers to be able to get a re-transplantation of their own liver tissue. Using autologous instead of allogenic liver transplantation will reduce the need for lifelong immunosuppression, which is associated with severe side effects.

This object is being addressed with a perfusion loop assembly and a method for ex-vivo liver perfusion as described in the following.

Definitions

Perfusion media, perfusion medium, perfusion fluid, perfusate: Fluid that is used in the tube set of the perfusion machine to perfuse the liver. This fluid could be whole blood, parts of the whole blood (e.g. plasma with synthetic hemoglobin), an artificial medium or physiological saline solution with or without addition and/or subtraction of components.

Reperfusion injury: Reperfusion injury is the tissue damage caused when blood supply returns to tissue after a period of ischemia or lack of oxygen (anoxia or hypoxia).

Ischemia: Ischemia (or ischaemia) is a restriction in blood supply to tissue, causing a shortage of oxygen, nutrients and glucose needed for cellular metabolism to keep tissue alive.

Perfusion loop: The perfusion loop should be connected to the liver by suitable means such as cannulas. The liver should be connected to the perfusion loop via two inlet ports, in particular via the hepatic artery (HA) and the portal vein (PV), and via one outlet port, in particular through the vena cava (VC). The perfusion loop is technically realized via the tube set. That includes all tubes, connectors, sensors, valves, ports, oxygenators, filters, dialyzers, pump heads, clamps and so on in order to enable the desired perfusion of the liver.

Tube set: The tube set is the technical realization of the perfusion loop to enable the desired perfusion of the liver that includes all tubes, connectors, sensors, valves, ports, oxygenators, filters, dialyzers, pump heads, clamps and so on.

Ex vivo: outside of the body; In vivo: inside the body

Dialysis machine: The technical term "dialysis machine" represents the unit able to realize dialysis of the perfusion fluid within the perfusion device (perfusion machine). The dialysis machine is part of the perfusion loop assembly of the perfusion device. The main part of the dialysis machine is a filter (e.g. a dialyzer, high-flux or low-flux filter) which consists of hollow membrane fibers. The filter has a perfusion fluid inlet (Perfusion-Fluid-In) and a perfusion fluid outlet (Perfusion-Fluid-Out) and the perfusion fluid is flowing around the outer side of the hollow fiber membrane. Inside the hollow fibers, the so-called dialysate fluid is flowing. Hence, perfusion fluid and dialysate are separated by the hollow fiber membranes. Through these membranes, mass transfer (e.g. by diffusion) and also fluid transfer (e.g. by convection) takes place between dialysate and perfusion fluid according to concentration and pressure gradients across the membrane. Therefore, by means of the dialysis machine, the ability to remove fluid from the perfusion loop and on the other hand push fluid into the perfusion loop is given. Two individually controllable pumps (e.g. roller pumps), one for Dialysate-In and one for Dialysate-Out, are part of the dialysis machine. By installing pressure sensors at all inlets (Perfusion-Fluid-In, Dialysate-In) and outlets (Perfusion-Fluid-Out, Dialysate-Out) of the filter, also the transmembrane pressure can be monitored and controlled. Generally, the dialysis machine is removing toxins from the perfusion fluid and equilibrates with the physiological dialysate solution through the membrane with respect to glucose, electrolytes, pH-value and so on. By installing flow sensors at all inlets (Perfusion-Fluid-In, Dialysate-In) and outlets (Perfusion-Fluid-Out, Dialysate-Out) of the filter, all flows can also be monitored and controlled.

Perfusion Loop Assembly

Thus, a perfusion loop is provided that is connected to the liver by suitable means such as cannulas. The liver should be connected to the perfusion loop via two inlet ports, in particular via the hepatic artery (HA) and the portal vein (PV), and via one outlet port, in particular through the vena cava (VC).

According to the invention, a perfusion loop assembly for an ex vivo liver perfusion is provided that comprises:
- at least one pump, in particular only one pump for providing a fluid flow of a perfusion fluid through a line that branches at a branching point into a first branch line and a second branch line downstream of the pump;
- the first branch line being configured to provide a first portion of the perfusion fluid to the hepatic artery (arteria hepatica propria or arteria hepatica communis) of the liver;
- the first branch line being coupled with at least one first gas exchanger, in particular only one first gas exchanger, wherein the first branch line comprises at least one flow rate sensor and/or at least one pressure sensor, the second branch line being configured to provide a second portion of the perfusion fluid to the portal vein (vena portae hepatis) of the liver;

the second branch line further comprising at least one first valve for controlling the flow of the perfusion fluid into the portal vein of the liver, wherein the second branch line comprises at least one flow rate sensor and/or at least one pressure sensor;

a liver chamber assembly configured to hold the liver ex vivo, an outlet line for the perfusion fluid connecting the liver chamber assembly and the pump.

In an embodiment of the perfusion loop assembly the first branch line comprises at least one port for administering additives, in particular vasodilators and vasoconstrictors, to the perfusion fluid in the first branch line.

In a further embodiment, the second branch line comprises at least one port for administering additives, in particular medication and/or nutrients, to the perfusion fluid in the second branch line.

In still another embodiment, a liver outlet line attached to the vena cava (vena cava inferior) of the ex vivo liver is provided, the liver outlet line further comprising at least one valve for adjusting the pressure in the outlet line, more precisely at the vena cava of the liver, wherein the outlet line comprises at least one pressure sensor, and wherein at least one reservoir is connected to the liver outlet line and upstream from the at least one pump.

In yet a further embodiment of the present perfusion loop assembly at least one bypass between the first branch line and the second branch line is provided, wherein the bypass connects the first branch line downstream of the at least one oxygenator with the second branch line downstream of the at least one valve, or at least one bypass between the first branch line and the at least one reservoir downstream of the oxygenator.

In one other embodiment of the perfusion loop assembly at least one dialysis machine for adjusting the composition of the perfusion fluid, in particular for adjusting the hematocrit value, pH, arterial resistance in hepatic artery, electrolytes and perfusate correction prior to perfusion start, is provided as part of the perfusion loop.

According to another aspect of the invention, a perfusion loop assembly for an ex vivo liver perfusion is provided that comprises:

at least one pump, in particular only one pump for providing a fluid flow of a perfusion fluid through a line that branches at a branching point into a first branch line and a second branch line downstream of the pump;

the first branch line being configured to provide a first portion of the perfusion fluid to the hepatic artery (arteria hepatica propria or arteria hepatica communis) of the liver;

the first branch line being coupled with at least one first gas exchanger (oxygenator), in particular only one first gas exchanger, wherein the first branch line comprises at least one port for administering additives, in particular vasodilators and vasoconstrictors, to the perfusion fluid in the first branch line; and optionally at least one sampling port for perfusion medium, wherein the first branch line comprises at least one flow rate sensor and at least one pressure sensor, the second branch line being configured to provide a second portion of the perfusion fluid to the portal vein (vena portae hepatis) of the liver;

the second branch line further comprising at least one first valve for controlling the flow (or pressure) of the perfusion fluid into the portal vein of the liver, wherein the second branch line comprises at least one port for administering additives, in particular medication and/or nutrients, to the perfusion fluid in the second branch line; and optionally at least one sampling port for perfusion medium, wherein the second branch line comprises at least one flow rate sensor and at least one pressure sensor;

a liver chamber assembly configured to hold the liver ex vivo, a liver outlet line attached to the vena cava (vena cava inferior) of the ex-vivo liver, the liver outlet line further comprising at least one valve for adjusting the pressure in the outlet line; in particular at the vena cava of the liver, and optionally at least one sampling port for perfusion medium, wherein the outlet line comprises at least one pressure sensor and optionally also a flow rate sensor, at least one reservoir connected to the liver outlet line and upstream from the at least one pump, at least one bypass between the first branch line and the second branch line, wherein the bypass connects the first branch line downstream of the at least one oxygenator with the second branch line or at least one bypass between the first branch line and the at least one reservoir, and at least one dialysis machine for adjusting the composition of the perfusion fluid, in particular for adjusting the hematocrit value, electrolyte concentrations, pH value, glucose concentration and lactate level, wherein the at least one dialysis machine is implemented between the at least one second branch line and the liver outlet line upstream of the at least one reservoir.

The perfusion loop assembly of the invention is able to provide necessary nutrients, metabolites, hormones, medications, electrolytes, proteins, fat, amino acids and gas supply, in particular oxygen supply, and is equipped to monitor growth, as well as assess the functional capacity of the liver outside of the body, e.g. regeneration. This will allow patients with formerly inoperable liver cancers to gain access to surgical resection. Additionally, performing autologous transplantation (patient receives liver tissue from his own body) will avoid the need for life-long immunosuppression and its associated severe side effects. The present regeneration strategy can also be used in allogenic liver transplantation (patient receives liver tissue from a donor) for end-stage chronic liver disease, where an organ transplant is the only treatment option. In this second approach, a healthy donor liver will be split into multiple parts, preferably between 2 and 5 parts or even up to 7 parts that will be grown in the perfusion machine, yielding multiple transplantable organs with sufficient (critical) size. With this approach, the organ donor pool would be increased, which would help to alleviate current donor organ shortage.

The perfusion loop assembly as described above has in preferred embodiments only one pump and one gas exchanger (oxygenator) for the complete perfusion loop. The perfusion flow is split downstream of the pump and divided into a hepatic artery branch (first branch line) and portal vein branch (second branch line). The use of only one pump and only one gas exchanger (oxygenator) reduces the overall hemolysis of the blood continuously pumped through the loop.

Besides the pump and the gas exchanger, the perfusion loop assembly comprises at least two ports for administering additives into the hepatic artery line and portal vein line, sensors for monitoring flow rate and pressure in the hepatic artery line, portal vein line and vena cava line (liver outlet line), a reservoir for the perfusion fluid, a bypass between hepatic artery line and portal vein line or a bypass between the hepatic artery line and the reservoir, and a dialysis machine for adjusting the perfusion fluid composition.

As mentioned above, it is possible to implement at least one dialysis machine into the loop assembly for adjusting the composition of the perfusion fluid. This is in particular of an advantage in case of long term perfusion (>24 h). In addition to the adjustment of the hematocrit value the dialysis corrects the electrolyte content (e.g. sodium, potassium, calcium, magnesium), pH value (e.g. via bicarbonate), glucose level, lactate level and removes toxins and metabolic waste products such as urea. Depending on the concentration and composition of the dialysate solution, pore size of the filter, transmembrane pressure etc. other components may be introduced into the loop assembly system via dialysis. Dialysis is important at perfusion start in human setting, since red blood cells preserved in special preservation solution with high potassium, no calcium and lactate accumulates during preservation. Those electrolyte and lactate levels can be and should be corrected prior perfusion start in human setting. Perfusion start without correction leads to pH imbalance after perfusion start, potentially reaching values that could lead to loss of the liver. Lack of calcium in human blood products can be used also to reduce ischemia reperfusion injury. Calcium contributes to ischemia reperfusion injury and at perfusion start, calcium can be corrected up to the lower or less than physiologic level. Further, dialysis washes out vasoactive substances, influencing the resistance in hepatic artery. Therefore, the dialysis machine can be used to control resistance in hepatic artery. If resistance in hepatic artery increases the dialysate flow rate is reduced or vice versa.

In an embodiment of the perfusion loop assembly, the at least one valve in the second branch line is a proportional pinch valve that is e.g. continuously adjustable by a control system. Pinch valves (or also gate clamps) can regulate the flow or pressure by squeezing the tubes and restricting the flow cross section. The proportional pinch valve is controlled by the position of an actuator e.g. a linear motor. The linear motor can open and close the pinch valve in a continuous range from 0 (fully open) to 100% (fully closed).

Thus, a control system is established that controls both liver inlets and outlet independently based on fixed flow rates or pressure set points by adjusting the pump, e.g. by adjusting the centrifugal pump impeller rotation speed and by opening and closing the proportional pinch valve in the second portal vein branch and a further proportional pinch valve in the vena cava branch (described in more detail below). In particular, the pressure is preferably controlled in the hepatic artery line and the vena cava line and the flow rate is controlled in the portal vein line. It is also possible to control the flow rate in both, hepatic artery line and portal vein line. In this case the flow rate in the vena cava line is not independent. Generally, pressure and flow in HA, PV and VC have to be always within the ranges (bands) given by the physiologic conditions of the human body.

This is possible because two active elements (pump and proportional pinch valve) control two independent flow branches (hepatic artery and portal vein). The control system continuously ensures that the defined set points (or ranges) with respect to flow rate and/or pressure are maintained by adjusting the active elements. The system does not require manual intervention nor manual oversight. Fixed flow rates or pressures can be maintained throughout the perfusion duration.

Alternatively to continuous (non pulsatile) flow, subtle centrifugal pump impeller rotation speed variation induces a pulsatile flow in the hepatic artery liver inlet branch. Custom shaped pulsatile flow analogous to the physiological one introduced by heart pulsation can be provided at the HA inlet of the liver. This will be described in more detail further below. Flow pulsation in the portal vein liver inlet branch can be reduced or eliminated by a certain closing of the proportional pinch valve or by adding a pulsation damper to the perfusion loop close to the portal vein inlet of the liver (e.g. a flexible tube enlargement out of a silicon like material).

As described above, the perfusion loop assembly comprises at least one gas exchanger, in particular an oxygenator. The oxygenator may be a membrane oxygenator with an integrated heat exchanger. The arrangement of the oxygenator solely in the first hepatic artery branch is the most physiological approach.

The perfusion loop assembly can be operated at a range of temperatures, as set via a thermostat connected to the at least one oxygenator. The oxygenator contains a port for a temperature indicator to measure the temperature of the perfusate, which thus provides a means to control the temperature directly in the perfusate via a dedicated controller, by adjusting the temperature of the thermostat. In this manner, a wide range of temperature can be covered, i.e. from 0° C. up to normothermic temperature of about 37° C. In case blood is used as perfusate, the temperature is preferably set between 22-34° C., preferably between 32°-34° C., for subnormothermic perfusion and between 34-37° C., preferably 37° C. for normothermic conditions. In case other perfusates are used, e.g. KPS solution, or any approved machine perfusion solutions, hypothermic conditions are practicable, e.g. between 4-15° C., preferably 8-10° C. The perfusion loop for perfusion at hypothermic conditions (4-15° C.) is designed in a way, that dual perfusion via hepatic artery and portal vein or only portal vein perfusion is possible.

Generally, liver perfusion can also be executed without cannulating the VC that results in an open perfusion loop assembly without vena cava line. In this case, a dedicated reservoir is not necessarily needed, because the liver chamber assembly configured to hold the liver ex vivo can be used as reservoir to store the perfusate.

As described above, the perfusion loop assembly may comprise at least one reservoir. Such a reservoir (as a closed system) is required for absorbing the volume change in the perfusion media originating from possible fluid absorption in the liver. It is also possible that the liver gives off fluid through its surface.

In a further embodiment of the present perfusion loop assembly, the at least one reservoir is a hard shell reservoir or a soft shell reservoir, like a blood bag, close to liver outlet (vena cava). The volume of the reservoir, such as a blood bag can be in the range of 0 to 5 l, more specifically, 0.25 to 3 l. The fill level of the reservoir is dependent on the perfusion media volume in the system and can change over the duration of perfusion due to the absorption and desorption of fluid by the liver, controlling mode of the dialysis machine, sampling of perfusion media, infusions and bile production. The fill level of the reservoir can be monitored and measured by sensing elements, for example by a gravimetric balance or by optical methods. Fill level and height of the reservoir in conjunction with the position of the vena cava pinch valve determine the outlet pressure of the liver at the vena cava. Furthermore, the height of the at least one reservoir relative to the liver may be controlled and adjusted. The height adjustment of the reservoir can be done by a linear motor or by a winch. All reservoirs are preferably equipped with a filter unit (pore size 20-200 µm) to remove small air bubbles and micro thrombus from the perfusate.

In one embodiment, the first branch line, the second branch line and/or the liver outlet line comprise an interface, in particular a cannulation with the hepatic artery vessel of the liver; the portal vein vessel and/or the vena cava vessel respectively. These interfaces can efficiently be made.

It is to be understood that in the context of the present invention the pressure values provided always refer to the mean pressure. Furthermore, the pressure should always be measured as close as possible to the liver vessels or liver ports (portal vein PV, hepatic artery HA, vena cava VC). Preferably, there should be no further branch or junction at the liver vessels subsequent to the measuring points for the flow rate; in this manner the exact flow rate through the liver is known.

It is also to be understood that there can be more than one pressure sensor, preferably two in each of the first branch line, second branch line and liver outlet line.

In one embodiment, at least the first branch line (hepatic artery line) and optionally also the second branch line (portal vein line) are in each case connected to at least one sensor, in particular a Terumo CDI510H shunt sensor for monitoring different parameters in the blood, e.g blood gases, in particular ($pCO_2$, $pO_2$), the pH-value and other components in the perfusion fluid. These values serve to calculate the oxygen saturation, bicarbonate concentration and base concentration in the respective line.

The sensor for monitoring physical quantities of interest of the perfusate (for example, the perfusate gases, pH and other components, and additionally, in the case of blood, the hematocrit value) in the hepatic artery line is implemented in a line that runs parallel to the hepatic artery line, starts downstream of the oxygenator at the hepatic artery line, then passes oxygenator, branching point, pump and reservoir, and is finally connected to the vena cava line upstream of the reservoir.

The sensor for monitoring the physical quantities of interest of the perfusate in the portal vein line is implemented in a line connecting the vena cava line (liver outlet line) downstream of the pinch valve in the vena cava line and the portal vein line downstream of the pinch valve in the portal vein line. The sensor for monitoring the blood parameters in the portal vein line is in particular a Terumo CDI510H shunt sensor.

In another embodiment, the liver outlet line (vena cava line) comprises at least one sensor, in particular a Terumo CDI H/S cuvette, for monitoring the oxygen saturation $SO_2$, hemoglobin and hematocrit value in the perfusion fluid leaving the perfused liver. Said sensor may be implemented in the vena cava line downstream of the pressure sensor or pressure sensors (which are adjacent to the vena cava) and upstream or downstream of the valve for adjusting the pressure in the liver outlet line. However, this sensor can be implemented at any suitable position in the vena cava line.

In yet a further embodiment of the perfusion loop assembly, the at least one port for administering vasodilators and vasoconstrictors to the perfusion fluid in the first branch line is implemented in the first branch line downstream of the at least one oxygenator and downstream of the bypass between first and second branch line (for avoiding any flow of vasodilators and vasoconstrictors into the portal vein).

In another embodiment of the perfusion loop assembly, the at least one port for administering additives, in particular medication and/or nutrients except vasodilators and vasoconstrictors, to the perfusion fluid in the second branch line is implemented in a parallel line to the second branch line. Said parallel line starts upstream of the at least one first valve in the second branch line, passes the valve and the bypass between first and second branch line, and ends downstream of the at least one bypass.

It is furthermore possible that the perfusion loop comprises at least one sensor for monitoring the glucose level and/or at least one sensor for monitoring the lactate level or the ammonium level in the perfusion fluid. Both sensors can be implemented at any suitable location in the loop assembly.

It is furthermore also possible that the perfusion loop comprises at least one sensor for continuously recording UV/VIS spectra of the perfusate, e.g. PendoTECH UV Absorbance Sensor & Monitor. The UV/VIS spectroscopy of a liquid solution can identify the absence or presence of the molecule of interest. The at least one sensor can be implemented at any suitable location in the loop assembly.

In a further embodiment, the perfusion loop may comprise at least one spectroscopic flow cell (flow-through cell, flow-through cuvette) for recording spectra via UV-VIS-spectroscopy, fluorescence spectroscopy, Raman spectroscopy, circular dichroism spectroscopy, (near) infrared spectroscopy or fluorescence spectra via fluorescence spectroscopy of at least one compound/molecule present in the perfusate. The flow cell is part of the perfusion loop (tube set, disposable set) and perfusate flows through this cell. In a preferred embodiment the fluoroscopic measurement can identify the absence or presence of the molecule of interest in the perfusate. The at least one spectroscopic flow cell can be implemented at any suitable location in the loop assembly, preferably at a location downstream of the liver in the liver outlet line. In a preferred embodiment, a fluorescence flow cell comprising a light probe and a receiver probe (preferably placed at 90°), integrated into the perfusion loop, preferably after the outflow of the liver organ. In an embodiment where the perfusate is sanguineous (e.g. whole blood), the perfusate flows directly through the flow cell or a portion of the perfusate passes a hemodialysis filter separating plasma fluid from blood cells e.g. red blood cells first and the plasma portion then flows through the flow cell. Both, blood cells and plasma are then recycled and rejoin the perfusate within the perfusion loop. Said fluorescence flow cell is used preferably for measuring the fluorescence of Flavin Mononucleotide (FMN) as a fragment of mitochondrial complex I. Detecting FMN in the perfusate during ex-vivo perfusion allows detecting the extent of ischemic mitochondrial injury to solid organ grafts prior to transplantation—in particular this method is applicable to all solid organs and tissue in an ex vivo perfusion system. The FMN signal intensity as extracted by the fluorescence spectra can be used to evaluate the degree of reperfusion injury of the organ. The real-time measurement of FMN in the perfusate facilitates clinical decision making (whether an organ should be transplanted or not, minimizing the transplantation risks for the recipient) by optimizing the matching process of the graft and the recipient and hereby improving the survival and quality of life of the recipient after transplantation. In addition to liver transplantation, this method is applicable to any ex vivo perfused tissue, preferably to solid organ tissue such as liver, heart, lungs, kidney, pancreas, uterus or intestine. By means of another flow cell, also the UV/VIS absorbance spectroscopy technology can be implemented in the perfusion loop to undertake light absorbance measurements of the perfusate in order to quantify the quality of the organ and therefore predict the outcome of the transplantation.

In another embodiment of the perfusion loop assembly the at least one bypass between the first branch line and the second branch line and the bypass between the first branch line and the reservoir comprise in each case at least one valve, in particular at least one pinch valve, and at least one flow rate sensor.

It is also desirable to provide one or several filter(s) or filtering materials at suitable locations within the perfusion loop assembly. Filtering the perfusion fluid may be of an advantage due to several reasons. During the perfusion process, the cell matrix of the dead and necrotic cells are washed out of the liver by the perfusion medium itself or it is washed away from the resection surface. Finally, this dead cell matrix (fibrinogen, collagen or other ECM proteins, may be in combination with glycans) is accumulating in the perfusion medium that can lead to different scenarios. First of all, these cell fragments can block the small vessels inside the liver that results in a non-homogeneous perfusion. Furthermore, this dead cell matrix in liver and blood leads to an inflammatory response. On the other hand, there is also a certain danger for the operation of the perfusion loop. Dead cell matrix can cover the inner surfaces of the perfusion loop. The hollow fibers of dialysis filter and oxygenator are covered by the cell matrix which leads to a decrease of the performance of the oxygenator and of the clearance within the dialysis filter. Moreover, this dead cell matrix can block the filter unit in the hard- or softshell reservoir that will lead to an interruption of the perfusion process.

In order to guarantee a safe and good perfusion of the liver within the perfusion device, the dead cell matrix and cell fragments should be removed from the perfusion medium. This can be done by offering a sufficient amount of foreign surface (e.g. filter surface) within the perfusion loop. This can be achieved by designing a reservoir (softshell or hard-shell) with sufficient internal filter capacity to remove the dead cell matrix, micro bubbles and micro coagulations before the perfusion fluid is again entering the head of the blood pump. Oxygenator and dialysis filter with a sufficient internal surface area can also act as filter unit for the dead cell matrix while simultaneously maintaining sufficient oxygenation and clearance performance.

In other embodiments several oxygenators, reservoirs (softshell or hard-shell) and dialysis filters may be arranged in parallel within the perfusion loop. In case one of these components did not show a sufficient performance due to the loading with dead cell matrix, this component is clamped off from the perfusion loop while simultaneously opening the connection to the next one that is connected in parallel.

In yet a further embodiment of the present perfusion assembly, the ascites (comprising a liquid that is emitted or delivered from the outer surface of the liver) are transported from the liver chamber back to the perfusion fluid. For this purpose at least one ascites line between the liver chamber and liver outlet line (vena cava line) or reservoir is provided. Said ascites line is connected to the liver outlet line downstream of the valve that adjusts the pressure in the liver outlet line (vena cava line).

In yet a further aspect of the present perfusion loop a device for measuring and monitoring the continuous bile production is provided. The present device allows determining the total bile production and bile production rate instantaneously, at all times and for all times. The amount of bile liquid typically produced is between 0 to 50 ml/h, preferably between 10 to 30 ml/h. The present device comprises a scale (resp. a force sensor), or at least one flow rate sensor operating in the relevant range or an optical device (for instance a spectrophotometer) for that purpose. In one variant, the bile liquid is drained from the liver (for example using a drain tube with a cannula connected to the bile vessel of the liver) to said monitoring device. It is also preferred if said device for monitoring bile production is connected to a controller and data logging system. In addition, an optical device can be used to assess the quality of the bile produced by the liver, e.g a UV-VIS spectrometer, e.g. PendoTECH UV Absorbance Sensor & Monitor as described above.

Apart from measuring continuously the bile production of the liver, also the weight of the liver chamber and the weight of the reservoir should be measured continuously during the perfusion process. This additional information enables to make the instantaneous overall balance of fluid in the perfusion system. The level of perfusate in the reservoir is an important parameter in the perfusion process, because below a certain level, safe perfusion of the liver cannot be guaranteed anymore. During the perfusion process, the system loses fluid due to bile production and also in the dialysis filter, fluid can be pushed into or removed from the system, e.g. fluid can be removed from the system for example as used within the hematocrit control strategy.

Moreover, an increasing weight of the liver chamber can indicate two problems in the perfusion process. First, the liver could have an outflow obstruction because a certain amount of fluid is accumulated in the liver. Such a problem can e.g. be corrected by repositioning the VC cannula or repositioning the pinch valve in the VC outlet line. The fluid accumulation in the liver is furthermore confirmed by the continuous flow rate measurements at all inlets (HA, PV) and the outlet (VC) of the liver. The second possible problem is an outflow problem of the ascites from the liver chamber which can be corrected by e.g. removing a coagulated blood portion in the outflow area of the chamber.

Apart from the ability to make the instantaneous overall balance of fluid in the perfusion system, there are also further aspects that indicate that the weight of the liver chamber respectively the weight of the liver is an important parameter during perfusion. In case of repairing, reconditioning and primarily in case of defatting of steatotic livers, the weight of the liver clearly indicates the status and the success of the treatment of the liver. Further, knowledge about the reservoir and liver chamber weight gives an indirect feedback about the blood volume in the perfusion system. Knowing the current blood volume is mandatory for a correct balancing and interpretation of blood parameters and, hence, the assessment of liver functionality and viability during perfusion.

The present liver chamber assembly is configured to hold a liver ex vivo, and comprises at least one chamber to guarantee sterility and control the desired inside conditions with respect to temperature, humidity, gas composition and pressure. Said chamber could be a closed box or a closed and flexible bag to protect the liver from environmental impact (temperature variations, unsterile air or fluid). The chamber has several sealed ducts for lines (sensor lines, electricity, compressed air, etc) and tubing connected to the liver or connected to inner parts of the liver chamber assembly. Said lines and tubing are e.g. hepatic artery, portal vein, vena cava, bile outflow, ascites outflow and so on.

Storage conditions such as temperature, moisture, position and pressure play a central role in retaining healthy conditions for the organ.

Temperature control in the liver chamber is achieved in two ways, namely insulation and provision of energy through a heat exchanger. Insulation is achieved by equipping the lid of the chamber with a suitable tightening system, in particular an expanded rubber or foam rubber or silicon glue, that seals the liver chamber airtight when the lid is attached to the chamber. In this way heat loss through mixing with ambient air is minimized. Temperature in the liver chamber is determined by the temperature of the perfusate fluid that is heated or cooled in the perfusion loop assembly, in particular in at least one of optionally multiple oxygenators in the assembly that can act as a heat exchanger, and by the wall temperature of the liver chamber. The liver chamber is equipped with a circulation tubing system that encapsulates the liver chamber acting as heat exchanging surface. The tubing of the circulation is perfused with a heat exchanging fluid by means of a pumping system, in particular through a heating or chilling circulator for liquids heat exchanging fluids or through an air pump for gaseous heat exchanging fluids.

The liver organ located in the chamber is sensitive to moisture levels, in particular the vessels that are exposed to the air present in the liver chamber. If moisture is too low in the liver chamber then parts of the organ dry out and the affected tissue is damaged or dies. Water vapor that saturates the air in the liver chamber is provided through the perfusate at the surface of the liver (ascites). Still, the vasculature, in particular the hepatic artery, portal vein and vena cava are susceptible to drying out and to prevent this damage moisturization of affected vessels is realized by providing additional moisture or liquid. In particular, fluid is provided to the vessels through a pump unit connected to lines running alongside the hepatic artery, portal vein and vena cava branches of the perfusion loop assembly, typically in a double walled tubing, wherein the inner line contains the perfusate and the outer line contains the fluid to moisturize said vessels. In some cases, perfusate and moisturizing fluid can be the same fluid. In a preferred embodiment, the moisturizing fluid is a sterile liquid, in particular sterile water or sterile aqueous NaCl-solution, typically with a 0.9% NaCl concentration, or an aqueous glucose solution, typically with a less than or equal to 5% glucose concentration, or dialysate solution, typically containing electrolytes (sodium, potassium, calcium, magnesium, chloride, bicarbonate, glucose, water), or sterile nutrient solution, typically parenteral solution. Said sterile liquid is provided to the liver chamber by using gravitation, in particular by placing the source of the moisturizing fluid higher than the liver chamber, or, preferably, through a pump, typically a roller pump with adjustable rate.

The vessels of the liver for HA, PV, VC and bile are connected via cannulas to the perfusion loop. Drying out of these vessels inside the liver chamber can be prevented by wrapping all vessels and cannulation points into a polymer foil to minimize evaporation. Also covering these vessels and cannulations points with a protective viscous substance is a possible way to go. Such a protective substance could be e.g. Vaseline.

The lid of the liver chamber is equipped with entry points for biopsy needles without having to open the lid. This ensures safe operation of the perfusion system without compromising sterility.

The support structure which is holding/storing the liver inside the chamber can be a woven filter medium (filter fleece) where the liver is placed on. The mesh size of the woven filter medium is between 5 µm to 1500 µm, most likely between 40 µm to 100 µm. By means of this special liver support structure inside the chamber, an additional filter element with a significant surface area is added to the perfusion loop able to filter the ascites stream and the blood that is leaking from the surface area of the liver. Apart from the mesh size of the woven filter medium, optionally also holes between 1 mm to 20 mm (in diameter) can be realized.

Method for Ex-Vivo Liver Perfusion

Several aspects and parameters should be considered when operating the present perfusion loop assembly. Thus, several beneficial aspects for conducting the method for ex vivo liver perfusion using a perfusion loop assembly are described in the following.

In one aspect of the method for ex-vivo liver perfusion the pressure in the liver outlet line is adjusted by the at least one pinch valve in the liver outlet line such that physiological pressure values and variations are generated, in particular pressure variations between −10 and 12 mmHg preferably between −5 and 10 mmHg, more preferably between 0 and 3 mmHg corresponding to the respiratory cycle.

Changes in pressure and flow occurring in liver outflow are of considerable practical importance during ex-vivo liver perfusion. In vivo pressure in vena cava, respectively in hepatic veins changes between 0 to 12 mmHg. Respiratory movement, heart cycle, muscle pump, venous wall elasticity and of most, closed type of circulatory system (vis a tergo, latin standing for: a force acting from behind) are main flow driving forces in vivo. Pathologic caval flow and pressure disturbance is observed in so-called Budd-Chiari syndrome, where pressure increase in inferior vena cava leads to hepatic outflow obstruction with vascular congestion and ischemic hepatocellular damage. If the venous pressure is too low, which could be observed by volume depletion, or if the negative pressure produced by gravity, vacuum or a pump is used during cardiopulmonary bypass, the venous system collapses partially or totally leading again to congestion, which in turn may result in inadequate perfusion. Of note, caval wall collapse depend not only on the compliance of the vessel but also on the amount of blood contained in the vessel. Although venous wall collapse can occur even in higher pressures, if the amount of blood contained in the vessel low. Ex vivo, such complex pressure and flow regulation is missing. An ex vivo liver perfusion system with a closed perfusion loop (closed mode, drained vena cava, cannulated vena cava) should be able to maintain and imitate such complex physiologic system.

As mentioned above, if the pressure in the vena cava is too low, the vein collapses and pressure oscillations in the vena cava pressure signal can be measured. Accordingly, these oscillations are continuously monitored and detected by the present loop assembly system. The system continuously monitors the minimum and maximum value of the vena cava pressure and stores these for a certain time interval in a range of 10 to 300 s, preferably of 20 to 200 s, more preferably 30 to 100 s. If the difference between the minimum and maximum vena cava pressure in this interval is greater than a certain threshold defined by the system, with the threshold being in the range of 5 to 30 mmHg, preferably of 10 to 20 mmHg, more precisely 10 mmHg, fluctuation is detected. Once fluctuation is detected, the system immediately increases the vena cava pressure set point by means of an algorithm. A possible algorithm can be to increase the vena cava pressure set point by a value between 1 and 5 mmHg, preferably 1 and 2 mmHg, and additionally in the course of a certain period between 10 s and 300 s, preferably 30 s, continuously increases the set point by another 1 to 5 mmHg, preferably 1 and 2 mmHg. Ideally, when the time interval, which is defined for the detection of the fluctuation in the VC pressure, has passed, the initial increase of the vena cava pressure by the defined value is removed and solely the continuous increase of the vena cava pressure set point remains. During normal operation, when no fluctuation is detected, the system continuously searches for the fluctuation point. This is realized by permanently decreasing the pressure set point for the vena cava by a rate in the range of 0.5 to 5 mmHg per hour, preferably 1 mmHg to 3 mmHg per hour. Once fluctuation has been detected, the set point is again increased by the algorithm described above, and the system again begins to search for the fluctuation pressure. By this means, the system tries to keep the vena cava pressure close to the fluctuation point.

As described above, the vena cava pressure varies between 0 to 12 mmHg in the body. These variations can occur periodically due to e.g. respiratory movement, or non-periodically due to e.g. body positioning. In order to mimic this behavior in the perfusion system, a periodic oscillation of the vena cava pressure is induced. The period of this oscillation can lie in the range from 1 second to 120 seconds and have an amplitude between 0 mmHg to 6 mmHg. The waveform of such an oscillation is preferably of sinusoidal nature, with a mean value in the range from 0 to 12 mmHg.

Furthermore, the liver has an intrinsic regulation mechanism for the resistance in the hepatic artery based on so called hepatic artery buffer response (HABR), where flow changes in the portal vein leads to wash out or accumulation of vasodilator adenosine with respective effect. If the portal vein flow decreases, the hepatic arterial resistance decreases as well and vice versa, if the portal vein flow increases, the hepatic arterial resistance increases. The system utilizes this physiological effect to control the resistance in the hepatic artery. The blood flowing through the hepatic artery is pressure controlled. As flow and pressure are directly coupled, it is not possible to control both parameters by means of one actuator. Therefore, as the pressure is steadily controlled, the flow is kept in a certain range (physiological range resp. band). If the flow in the hepatic artery is below a certain level, the flow in the portal vein is reduced and vice versa, if the flow in the hepatic artery is above a certain level, the flow in the portal vein is increased. These changes in the portal vein flow have immediate effects on the hepatic arterial resistance.

In another aspect of the method for ex-vivo liver perfusion, a pulsatile flow is induced in the first branch line (hepatic artery line) by a pulsatile operation of the at least one pump.

As described above in detail, the present loop assembly system consists of one pump that pumps the entire blood supply to the liver. Downstream of the pump, the flow is split into two lines (first and second branch line), which eventually feed the hepatic artery and the portal vein. The line leading to the portal vein is clamped by means of a pinch valve in order to increase its resistance and provide the required flow rate ratio between the hepatic artery (e.g. 25%) and portal vein (e.g. 75%).

Pulsatile flow has following superiorities compared to non-pulsatile (continuous) flow:
    Peripheral resistance is reduced by pulsatile flow mediated by more nitric oxide (vasodilator) release compared to non-pulsatile flow
    Less lactate release with pulsatile flow during perfusion
    Hemolysis is considered as a marker of perfusion impairment. Pulsatile flow reduces hemolysis providing better perfusion compared to non-pulsatile flow
    Pulsatile flow improves bile duct perfusion, which is confirmed with less release of bile duct injury markers (e.g. GGT, LDH, Ki-67 H&E and CK7 cell staining)

Because blood flow depends on energy gradients, it should be expressed in energy-equivalent pressure (EEP). EEP is equal to the ratio between the area under the hemodynamic power curve and the area under the pump flow curve at the end of a pump cycle ($EEP[mmHg]=\int_{t1}^{t2}(pfdt)/\int_{t1}^{t2}(fdt)$), where t1 is the start time of the pump cycle, t2 is the end time of the pump cycle, f is pump flow in L/min, and p is pressure in mmHg. For non-pulsatile flow, mean arterial pressure (MAP) equals EEP. In opposite, EEP in pulsatile flow is higher than MAP and is used to quantify (pulse pressure) PP dose. During ex vivo liver perfusion, pulsatile flow should be created considering EEP in a physiological range. EEP is the opening pressure for the microcirculation to provide an adequate flow in the liver (Hoefeijzers, M. P. et al. The pulsatile perfusion debate in cardiac surgery: Answers from the microcirculation? J. Cardiothorac. Vasc. Anesth. 29, 761-767, 2015).

The pulsation in the hepatic artery is realized by pulsatile operation of the blood pump. For this purpose, a signal of the desired pulse shape is sent as the set point of the rotational speed of the pump. The numerical implementation of the pulse shape of the hepatic artery is preferably realized by a superposition of sine waves rather than a single sine wave. In combination, such superposition can be manipulated so as to mimic the shape of a physiological heart pulse pressure at the HA inlet of the liver. More precisely, two sine waves are superposed. One sine wave has a frequency of the desired pulse frequency, e.g. 60 pulse per minute or 1 Hz, and the other sine wave has a higher frequency, more precisely double the frequency of the first sine wave. Further, the amplitude of the higher frequent sine wave is smaller than the one of the low frequent sine wave, more precisely half the magnitude. Further, the second sine wave is shifted in phase with respect to the first sine wave, more precisely by 3/16 of the period of the entire pulse. Target diastolic pressure in the hepatic artery is between 40-80 mmHg, more precisely 50 mmHg, and target systolic pressure in the hepatic artery is between 70-120 mmHg, more precisely 80-100 mmHg, in particular 80 mmHg. The frequency of the pulsation is in the range of 50 to 100 pulse per minute, more precisely 60-80 pulse per minute, in particular 60 pulse per minute.

The system continuously measures the pressure of the hepatic artery to determine the systolic, diastolic and mean arterial pressure. The difference of the measured systolic and diastolic pressure is used in a controller to control the amplitude of the sine wave. More precisely, the set difference between the systolic and diastolic artery pressure, e.g. 80 mmHg 50 mmHg=30 mmHg, and the measured difference are subtracted from each other and fed into a controller to minimize the error. The output of the controller is the amplitude of the first sine wave, while the amplitude of the second sine wave can be derived from this. By continuously measuring the pulse pressure and comparing it to the desired pulse pressures, the amplitude of the pulse waveform for the set-point of the rotational speed of the pump is feedback controlled such that the desired pulse waveform is reached.

The mean pulse pressure is controlled via the pinch valve in the portal vein line. The arterial pressure is continuously measured and compared to the desired mean arterial pressure, which results from the desired systolic and diastolic pressure. Furthermore, hollow-fiber membrane oxygenators have significantly lower pressure drops and are more suitable for use with pulsatile flow during ex vivo liver perfusion. The intensity of the pulsatility is dependent on the length of the arterial cannula tip. An arterial cannula with a shorter tip should be used for better pulsatility. Of course, the pump may be operated in a non-pulsatile manner, too. In this case, only mean pressure is used to control the system.

Furthermore, pressure and flow regulation in vivo is very complex and takes places with participation of the neural and humoral factors, which are missing ex vivo. During cardiopulmonary bypass the targeted flow is between 2.2-2.4 L/min/m$^2$ of body surface and pressure generally targeted >60 mmHg. In obese patients instead of actual body weight ideal body weight is considered for required flow calculation. If the mean arterial pressure >90 mmHg and flow >2.2 L/min/m$^2$ the hypertension is treated with vasodilators. If mean arterial pressure <60 mmHg and flow >2.0 L/min/m$^2$ hypertension is treated with vasoconstrictors. In the liver, historically usually 100 ml per 100 g liver tissue per minute is reported. Of those, 75% goes through portal vein and 25% distributed through hepatic artery. The recent flow measurements however demonstrated, that the flow is lower than previously reported. During ex vivo perfusion the loop assembly system should be able to maintain the hepatic artery and portal vein flow and pressure corresponding to in vivo values (physiological conditions). All missing neural and humoral factors for flow and pressure regulation should be replaced externally with respective medications.

The targeted mean pressure in hepatic artery is between 60 and 90 mmHg, more precisely 60 mm Hg. Targeted flow in hepatic artery is between 200 and 900 ml/min, more precise <600 ml/min, such as between 250 and 500 ml/min.

If mean arterial pressure is less than 60 mmHg and flow above or equal to 600 ml/min, vasoconstrictors are used to maintain the vascular resistance. For vascular resistance any vasoconstrictors can be used. More precisely, Phenylephrine is chosen due to a smaller hypertensive effect on portal pressure compared to other vasoconstrictors. The system automatically detects the targeted (physiological) flow and pressure (ranges) and if there is any deviation from the targeted values, the system starts to inject vasoconstrictors.

If mean arterial pressure is above 90 mmHg and flow lower than or equal to 250 ml/min, vasodilators are used to maintain the targeted vascular resistance. For vascular resistance, any vasodilators can be used. More precisely epoprostenol or any prostaglandin analogs are chosen due to their anti-inflammatory effect. The system automatically detects the targeted (physiological) flow and pressure (ranges) and if there is any deviation from the targeted values, the system starts to inject vasodilators.

Dialysis is required during ex vivo perfusion to correct electrolytes and to remove toxins and metabolic waste products. An important implication of the dialysis' ability to exchange mass and fluid with the dialysis fluid through the dialysis column is that it can influence the resistance and the flow in portal vein and, in particular, in the hepatic artery, namely by washing out or providing vasoactive substances to the perfusate via the dialysis column. It thus provides a means as to control flow and resistance in hepatic artery. In typical settings, dialysis washes out nitric oxide and other vasoactive substances thereby causing high resistance in hepatic artery and oscillations of the flow in HA, although said vasoactive substances could also be provided to the perfusate by adding them to the dialysis fluid (dialysate). Constant flow maintenance with vasodilators is compromised when nitric oxide is lacking. Nitric oxide synthesis can be induced (enhanced) by adding amino acids into the perfusate or dialysate participating in nitric oxide synthesis—more precisely arginine and citrullin. If flow in hepatic artery starts to oscillate, vasodilators are injected. At the same time, amino acids are administered until the flow becomes stable again within the desired physiological range. At this point, vasodilators injection is stopped. At the same time, upon change in hepatic artery resistance, the dialysis rate can be reduced to keep vasoactive substances in the perfusate.

All available parenteral vasodilators and vasoconstrictors have short half-life time (2-5 min) and there is the so called first passage effect through the liver. In detail, half of the dose will break down when it passes the first time through the liver. Of note, medications flowing through portal vein does not have effect on hepatic artery resistance. To reduce the given dose and avoid unnecessary first passage effect through portal vein, all vasoactive substances (e.g. vasodilators) should be administered through the arterial line.

Thus, in a further aspect of the present method for ex vivo liver perfusion, the targeted mean pressure in the first branch line (hepatic artery line) is adjusted by administering vasodilators and/or vasoconstrictors into the first branch line through the at least one port which is implemented at a suitable location in the first branch line.

It is furthermore of importance that the concentration of erythrocytes in the blood, referred to as hematocrit, is maintained in a physiological range between 30% and 45%, preferably 35%. Due to hemolysis induced by the system and natural dying of the erythrocytes, the amount of erythrocytes reduces during the course of the ex vivo perfusion. Further, due to continuous infusion of additives, such as nutrition, medication and bile production, the plasma content in the blood can vary and further influence the hematocrit of the blood. In order to keep the hematocrit level constant, fluid needs to be either introduced to or removed from the system. This can be controlled via the dialysis. In the dialysis, the inflow and outflow rate of the dialysate are controlled. The difference between inflow and outflow rate is referred to as trans-membrane-flow (TMF). A positive TMF adds fluid to the system, while a negative TMF removes fluid from the system. To manipulate the TMF, the system keeps the inflow rate of the dialysate constant and solely varies the outflow rate of the dialysate. This ensures that there is always a sufficient amount of dialysate inflow in order to keep further functions of the dialysate viable. The desired TMF is in the range of −100 ml/h and 100 ml/h. By controlling the TMF, the system can vary the amount of plasma in the blood and thus, the hematocrit. In practical terms, the hematocrit is continuously measured by means of a sensor, preferably by the Terumo CDI500 Cuvette. This allows for a continuous control of the hematocrit value in the blood while minimizing the effect on other functions of the dialysis.

Thus, in yet another aspect of the present method for ex-vivo liver perfusion, the perfusion medium or perfusion fluid undergoes dialysis during ex vivo perfusion for correcting electrolytes, removing waste products and for maintaining the hematocrit level in the perfusion fluid in the physiological range.

Furthermore, blood gas analysis is a test that measures the oxygen tension ($PO_2$), carbon dioxide tension ($PCO_2$), acidity (pH), oxyhemoglobin saturation ($SO_2$), bicarbonate ($HCO_3$) concentration, electrolytes, glucose and lactate in blood (arterial, venous or mixed blood). All measured parameters in blood plasma and various other body solutions are among the most tightly regulated variables in human physiology. Any change in those parameters induce tremendous changes at the level of the cell and organ. Hypoxia is defined when arterial pressure of oxygen ($PaO_2$)<10 kPa and has deleterious effect on tissue metabolism. Similarly, hyperoxia is considered as toxic. Although hyperoxia is not precisely defined but significant elevations of the partial arterial pressure of oxygen ($PaO_2$) are found to increase cellular injury through increased production of reactive oxygen species (ROS), such as the superoxide anion, the hydroxyl radical, and hydrogen peroxide. Therefore, the ex-vivo liver perfusion assembly needs to be able to maintain arterial pressure of oxygen ($PaO_2$) and respectively oxyhemoglobin saturation ($SO_2$) at physiological levels (arterial pressure of oxygen ($PaO_2$) between 10-12 kPa and oxyhemoglobin saturation ($SO_2$) between 95-100%).

The next tightly controlled parameter is the blood pH with normal range for arterial blood between 7.35-7.45. The blood pH stands for "power of hydrogen" and determined by the concentration of hydrogen ions. In vivo control is complex with participation of several organs and systems. Of those following regulatory organs and systems are mostly important:

Respiratory regulation: Carbon dioxide generates carbonic acid when combined with water. In lungs, carbonic acid is converted back and carbon dioxide and is expelled with respiration. An increased respiration rate decreases carbonic acid in blood, the acidity of the blood, and thus increases pH. Likewise, a decreased respiration rate increases carbonic acid in blood and thus decreases pH. Respiratory regulation of pH takes seconds to minutes.

Kidney regulation: Kidneys excrete some water-soluble acids such as sulfuric and phosphoric acids and other, frequently produced by protein metabolism. They can also recover bicarbonates, which increases pH. However, regulation of pH can take hours to days.

Buffers: The blood buffers are the most immediate way that regulates pH. It includes hemoglobin, protein, phosphate, bicarbonate and other buffer systems. Of those, the bicarbonate buffer is the most important, since it can be easily applied during live perfusion to regulate the pH value.

The target $PaO_2$ values may be between 10-12 kPa, more precisely 11 kPa and $SO_2$ values are between 95 and 100%, more precisely 97% and are controlled with the respective gas flow rate (gas mixture) through the oxygenator. The gas mixture fed to the oxygenator consists preferably out of oxygen ($O_2$), nitrogen ($N_2$) and optionally carbon dioxide ($CO_2$). If $PaO_2$ or $SO_2$ are lower than said target values, the assembly system increases the $O_2$ gas flow through the oxygenator.

As described, the assembly system may also control continuously the pH which is in turn controlled by $PaCO_2$. The target pH is between 7.35-7.45, more precise 7.4. If the pH is below that target value, the assembly system increases $N_2$ gas flow through the oxygenator to expel $CO_2$ from the blood and thereby increases the pH. Likewise, if the pH increases the assembly system decreases the $N_2$ flow rate through the oxygenator and therefore decreases the amount of $CO_2$ removed from the blood (through oxygenator), thus decreases the pH. Important to note is that the increase of $N_2$ flow leads to a decrease of $PaO_2$. Thus, the assembly system should increase at the same time the $O_2$ flow rate.

At the start of the ex-vivo perfusion process, the liver is commonly at hypothermic temperature and produces little to almost no $CO_2$. Therefore, the assembly system may provide separate $CO_2$ flow to the oxygenator to regulate $PaCO_2$, respectively pH, if $PaCO_2$ cannot be adjusted only by using the $N_2$ flow rate through the oxygenator.

If the pH is below the target value and $PaCO_2$ regulation is not sufficient to adjust the pH, bicarbonates are injected automatically with target base excess (BE) values between −3 and +3, more precise 0.

The kidney function for pH control is replaced by dialysis. At the same time with $PCO_2$ regulation and bicarbonate injection, dialysis rate is adjusted to wash out water-soluble acids and recover bicarbonates given through dialysis filter.

Due to the scenarios and facts described above, the gas flow rates of the individual gases ($O_2$, $N_2$ and optionally $CO_2$) fed to the oxygenator have to be continuously measured and controlled e.g. via gas flow controllers Therefore, in further aspects of the present method for ex-vivo liver perfusion the blood gases, in particular ($pCO_2$, $pO_2$) and other components in the perfusion fluid, in particular potassium, in the first branch line (hepatic artery line) and the second branch line (portal vein line) are monitored by at least one of the sensors in the first branch line and the second branch line, respectively. Furthermore, the oxygen saturation $SO_2$, hemoglobin and hematocrit value in the perfusion fluid in the liver outlet line (vena cava line) are monitored by the at least one sensor (e.g. Terumo CDI500 Cuvette) in the liver outlet line.

By means of the sensors, namely Terumo CDI500 Shunt-Sensor and Cuvette, the system is able to continuously measure $pO_2$, $pCO_2$, pH, $SO_2$, $HCO_3$—, hemoglobin, hematocrit and base excess (BE) of hepatic artery, portal vein and vena cava. These are used in conjunction with gas flow controller and infusion pumps to control the blood gases of the blood and maintain these values within the physiological ranges. Three independent gas flow controller for $O_2$, $CO_2$, and $N_2$ are implemented.

$pO_2$ control hepatic artery: The oxygen saturation of the hepatic artery, $SO_2$, is controlled by the oxygen content of the gas flow through the oxygenator. The target $SO_2$ values of the hepatic artery are in the range of 90-100%, preferably 97%. The $O_2$ in the blood and in the gas flowing through the oxygenator are preferably always in equilibrium (through the membranes). By increasing the $O_2$ content in the gas flow, the $O_2$ content in the blood is also increased. Therefore, this direct dependency is utilized to control $O_2$ content in the blood. The $O_2$ content in the gas flow increases either by increasing the $O_2$ gas flow rate, decreasing $N_2$ gas flow rate or decreasing $CO_2$ gas flow rate. Vice versa, the $O_2$ content in the gas flow decreases when lowering the $O_2$ gas flow rate, increasing $N_2$ gas flow rate or increasing $CO_2$ gas flow rate. These three aspects are used (via control strategies) to manipulate the $O_2$ content in the blood.

$pCO_2$ control hepatic artery: As the liver consumes $O_2$ while producing $CO_2$, the $CO_2$ needs to be removed from the blood. Analog to the $O_2$ content in the blood, the $CO_2$ in the blood also equilibrates with the $CO_2$ in the gas flow through the oxygenator. Further, the $CO_2$ exchange through the oxygenator depends on the mass transfer coefficient on the gas side of the oxygenator and the total gas flow rate also manipulates the $CO_2$ content in the blood. Which of the two mechanisms is utilized depends on the rate limiting step. If the liver produces a sufficient amount of $CO_2$, which is normally the case during perfusion, simply manipulating the total gas flow rate keeps the $CO_2$ content of the blood in the desired range. However, if the liver is not producing sufficient amounts of $CO_2$, as occurs during the start of the perfusion, additional $CO_2$ needs to be supplemented in the gas flow to the oxygenator to keep the $CO_2$ content of the blood in a physiological range. The $CO_2$ content in the blood reduces by lowering the $CO_2$ gas flow rate, hence, lowering the $CO_2$ content in the gas flow through the oxygenator, or by increasing $N_2$ or $O_2$ gas flow rate, thus, increasing the total gas flow rate through the oxygenator. Analog, the $CO_2$ content in the blood increases by increasing the $CO_2$ gas flow rate, hence increasing the $CO_2$ content in the gas, or by decreasing $N_2$ or $O_2$ gas flow rate, thus, decreasing the total gas flow rate through the oxygenator.

pH control hepatic artery and portal vein: Further, the system maintains the pH of the arterial blood in a physiological range between 7.3 and 7.45, preferably at 7.4. $CO_2$ is mainly present in the blood dissolved as bicarbonates ($HCO_3$). If the $CO_2$ concentration in the blood is increased, bicarbonate and hydrogen are formed. Therefore, an increase of $CO_2$ content in the arterial blood results in a decrease of the pH. By these means, the system uses the $CO_2$ content of the arterial blood to control the arterial pH in the desired range. If pH is too high, the $pCO_2$ level is increased and vice versa, if the pH is too low, the system lowers the $pCO_2$ level. $pCO_2$ is varied in a range from 4 to 6.5 kPa to maintain the pH level as desired. Portal vein blood pH is dependent from venous blood pH and amount of bypass flow and will be more acidotic compared to arterial blood at physiologic conditions.

Additionally, arterial pH is influenced by supplementary infusion of bicarbonates. The system measures bicarbonates level or base excess (BE) level of the arterial blood continuously. Desired BE levels range from −5 mmol/L to 5 mmol/L, preferably 0 mmol/L. If the arterial BE level is too low, bicarbonates are infused through supplementary infusion pumps. In conjunction with the pH control via $pCO_2$ control, the system is capable of providing physiological conditions in the arterial blood for pH, $pCO_2$ and $HCO_3^-$/BE.

$SO_2$ control vena cava: In opposite to other organs liver has two sources of blood supply. One through the hepatic artery, where arterialized blood with partial arterial pressure of oxygen of 10-13 kPa and the other hand through the portal vein where venous blood with partial pressure of oxygen of 4-7 kPa or $SO_2$ 40 to 80% are supplied to the liver. The assembly system needs preferably to be able to provide physiologic venous oxyhemoglobin saturation ($SO_2$) (40 to 80%) in the portal vein unit. Providing arterialized blood through portal vein causes increase of tissue oxygen pressure with consecutive production of harmful reactive oxygen species (ROS) and tissue damage.

During ex vivo liver perfusion with venous blood supply through portal vein the control of venous output gas content may be more important than the control of venous input though portal vein.

This may be achieved by a specific loop system for venous blood oxygen saturation in the portal vein blood. This loop system is implemented by the bypass between hepatic artery line and portal vein line.

Target values for the venous pressure of oxygen ($PvO_2$) in the vena cava line are 20-60 mmHg or 2.7-7.9 kPa, more precisely 40 mmHg or 5.3 kPa. Target values for oxyhemoglobin saturation ($SO_2$) vena cava line are 40 to 80%, more precisely 65%. If the target values decline, the assembly system increases automatically oxygen content in the portal vein unit. At steady state, oxygen concentration of the vena cava is in equilibrium with the oxygen concentration of the hepatocytes. Therefore, the oxygen concentration in the cells can be indirectly controlled via the VC oxygen concentration. In physiological conditions, the portal vein saturation $SO_2$ varies between 70-90% and the hepatic vein saturation lies in the range of 40-70%, preferably 65%. It is worth noting that arterial blood in the portal vein leads to increased release of ROS and venous blood supply through portal vein reduces ROS release.

The present assembly system controls the oxygenation of the portal vein by the following means. In the system, only the hepatic artery flows through the oxygenator while the portal vein tube bypasses the oxygenator. Downstream of the oxygenator, the hepatic artery tube is split into two lines and part of the oxygenated blood is lead into the tube leading to the portal vein. By means of this bypass ("portal bypass"), the oxygen content of the portal vein can be controlled. The control is realized by means of a cascaded control.

Figure 1B:
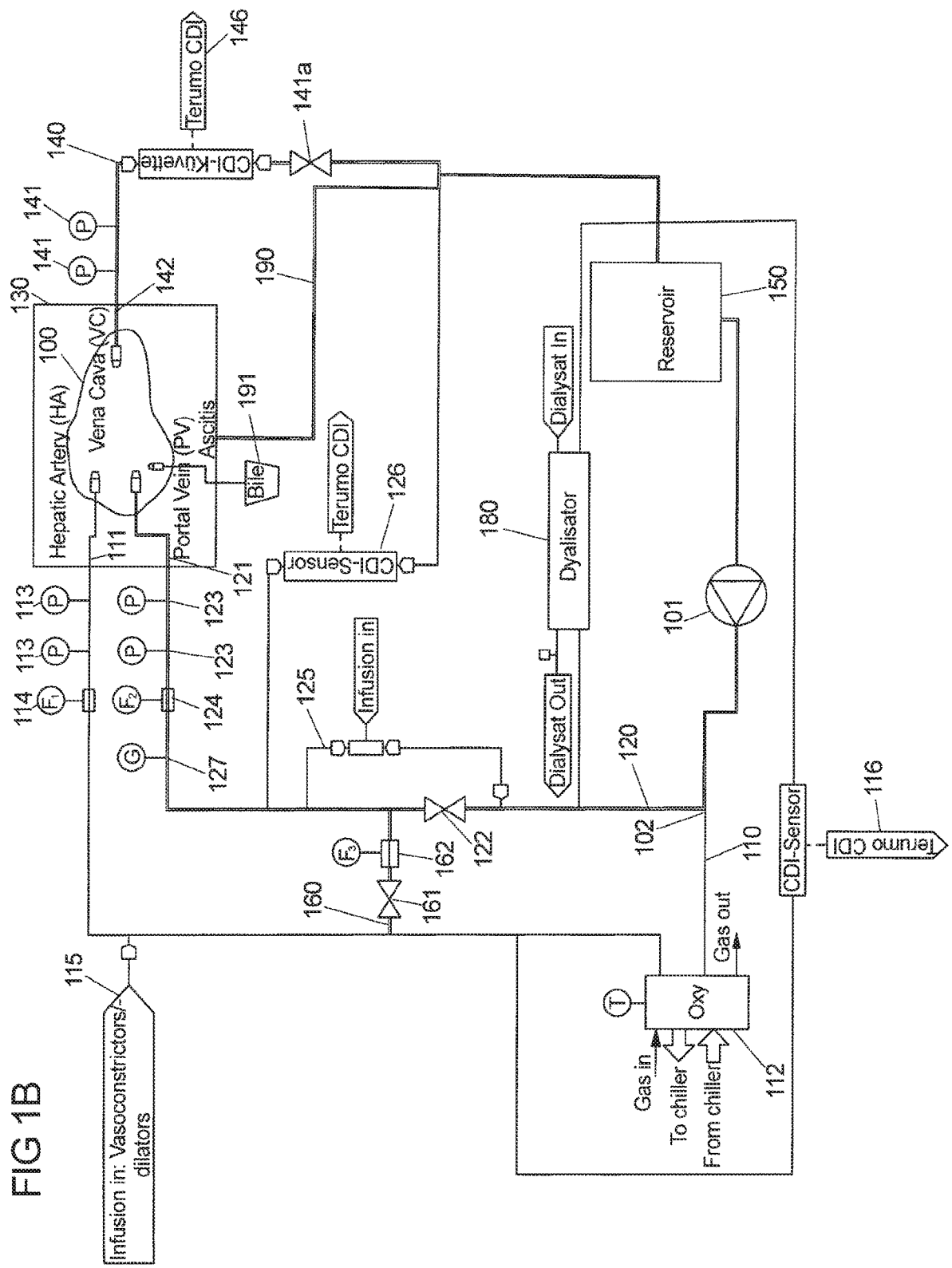
Figure 1D:
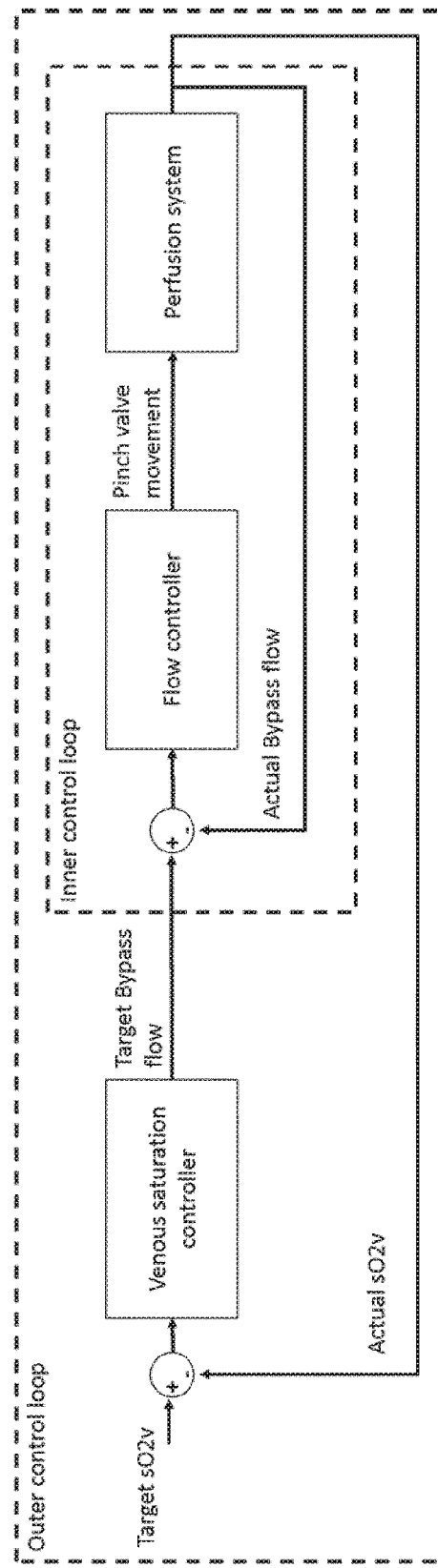

Said cascaded control of the portal bypass comprises an inner control loop and an outer control loop, as illustrated in FIG. 1D. The outer control loop, which acts more slowly than the inner one, controls the oxygen saturation of the vena cava by varying the bypass flow set point. The bypass flow set point is then used as target bypass flow set point for the inner control loop, which then modifies the bypass flow rate by controlling the continuous pinch valve. In particular, if the flow rate through the said portal bypass is too high, the pinch valve clamps the tubing in order to increase the flow resistance and therefore decreasing the flow while, if the flow rate is too low, the pinch valve opens up to reduce the flow resistance in the portal bypass.

In another aspect of the present method for ex vivo liver perfusion, it is desirable to monitor the glucose level in the perfusion fluid online by means of a glucose sensor.

Steady level of glucose maintenance in the body (blood) is regulated by hormones released from the pancreas into the blood. Insulin and glucagon are the primary hormones, and the release is dependent on the blood glucose level. Insulin causes to take up glucose from the circulation, increases glycogen synthesis from glucose and lipogenesis. Glucagon has an effect opposite to that of insulin. During ex vivo liver perfusion, the system should be able to provide a steady level of glucose maintenance. This requires continuous glucose measurement and insulin and or glucagon injection depending on glucose level in the perfusate, since these hormones have very short half life time allowing exact control of injection.

In the system, a sensor continuously measures the glucose level in the perfusate (e.g. blood). The blood glucose level is kept in a physiological range (band) between 4 and 7 mmol/l, preferably 5.5 mmol/l. However, upper and lower levels depend on clinical indication. The main hormones regulating the blood glucose level are insulin and glucagon. A too long presence of these hormones in the blood blunt the sensitivity of the respective receptors in the hepatocytes. Therefore, a discontinuous infusion of these hormones in a counteracting manner is desired. If the blood glucose value is below the desired level, e.g. 5.5 mmol/l, the system automatically injects glucagon to promote the liver to release the stored glycogen into glucose in the blood stream. On the other hand, if the blood glucose value is higher than the desired level, e.g. 5.5 mmol/l, the system automatically injects insulin to promote the uptake of glucose into the liver. During the infusion of one hormone due to the control algorithm, the other hormone is still being infused at a basal rate.

The injection rate of insulin, lies in the range of 0 to 10 IU/h, preferably between 0.1 and 2.5 IU/h, depending on the glucose level. The injection rate of glucagon lies in the range of 0 to 2 IU/h, preferably between 0.1 and 0.5 IU/h, depending on the glucose level. The algorithm to determine the infusion rate of the hormones considers the difference of the set point and the actual glucose value and injects a proportional rate of the respective hormone. For glucagon, the proportional factor lies in the range of 0.01 to 0.5 (IU/h)/(mmol/l), preferably 0.2 (IU/h)/(mmol/l). For insulin, the proportional factor lies in the range of 0.1 to 2 (IU/h)/(mmol/l), preferably 0.8 (IU/h)/(mmol/l). The basal rate of glucagon is in the range of 0.01 to 0.1 IU/h, preferably 0.02 IU/h, and the basal rate of insulin is in the range of 0.01 to 0.1 IU/h, preferably 0.02 IU/h.

In yet another aspect of the present method for ex vivo liver perfusion it is desirable to monitor the lactate level in the perfusion fluid online by means of a lactate sensor.

If cells undergo anaerobic metabolism, lactate is produced as end product. Therefore, if lactate levels in the blood increase, it can be a sign of deficient amounts of oxygen being supplied to the cells. A continuous lactate sensor in the blood stream provides a manner to control the adequacy of perfusion to the liver based on current lactate levels. If there is no lactate (close to zero) in the blood, the liver is well perfused. On the other hand, if lactate levels in the blood are rising, perfusion parameters should be adjusted in order to improve the perfusion of the liver It is yet desirable to improve the steatotic liver vulnerability by a defatting step and reduction of reperfusion injury. The gap between available organs and patients on the waiting list is increasing. Currently 15 to 20% of liver allografts are discarded after or before harvesting, notably due to steatosis. Grafts with macrosteatosis >40% do not tolerate cold storage and show a primary non-function rate >80-90% in case of transplantation. Rescue of such organs could increase available donor pool. The exact mechanism of steatotic liver vulnerability is matter of debate. Two main theories are worth mentioning. First, increased lipids peroxidation after cold storage and consecutive overwhelming ischemia reperfusion injury and second, sinusoidal obstruction with malperfusion due to fat related ballooning of hepatocytes. Respectively to these theories, the following strategies are preferably be applied to rescue steatotic livers: (1) amelioration of ischemic injury: avoidance or minimal cold storage with subnormothermic machine perfusion, controlled rewarming and controlled re-cooling prior to implantation; and (2) defatting to normalize hepatocyte size. Fat is stored in hepatocytes in the form of triglycerides (TG) inside lipid droplets. Cytosolic lipase liberates free fatty acids from triglycerides. Free fatty acids can then undergo mitochondrial β-oxidation and further converted to ketone bodies or esterified again to TG and packed into very low density lipoproteins and secreted into blood. Increase of β-oxidation, conversion into ketone bodies or package into very low density lipoproteins with consecutive secretion and removal from blood are main pathogenic mechanisms of defatting.

Thus, in one embodiment it is desirable to place the cannula into side branches of portal vein and hepatic artery without compromising hepatic circulation. Those can be used immediately on the perfusion loop assembly and appropriate cannulas are placed into main vessels. Furthermore, a back table preparation on the perfusion may be done, while perfusion is running. A controlled rewarming and controlled re-cooling up to +4° C. using a rewarming protocol in reverse manner prior to graft implantation may be applied (rewarming is described below). A continuous β-oxidation stimulation and activation may be triggered by applying glucagon, activators of adenosine monophosphate-activated protein kinase, (addition of) forskolin and, L-carnitine during ex vivo liver perfusion. Furthermore, the excess of ketone bodies released in response to glucagon may be washed out through dialysis. A continuous glucagon infusion rate control based on continuous glucose level measurement in perfusate may be applied. By adding amino acids and choline an increase of package into very low density lipoproteins and consecutive secretion and removal from blood with lipophoresis connected to perfusion loop may be achieved.

As just mentioned, a rewarming step before starting perfusion may be of advantage. This is due to the fact that the standard liver harvesting process includes liver cooling with one of the preservation solutions at +4° C. and placing the organ in a sterile packaging onto ice for transportation. During portal vein anastomosis of 30 to 90 minutes, so called rewarming ischemia time, liver is at room temperature and is at a temperature greater than 4° C. when perfusion is started. The ex vivo liver perfusion machine can imitate this rewarming. However, following technical aspects should be considered during rewarming: (1) Rewarming should be gradual in the sense that temperature of the perfusate stream is not heated too fast, such that neither the organ nor the perfusate are damaged by the temperature variation, e.g. from cold storage temperature (~4° C.-10° C.) to body temperature (normothermic) or lower (subnormothermic) within reasonable time, e.g. 20 minutes up to hours, more precisely at a rate of 0.2° C./minute up to 2° C./minute, preferably 0.5° C./minute. (2) The liver vasculature is rigid at +4° C. Pressure and flow should be increased slowly starting from zero. (3) Keeping in mind the temperature dependence of the oxygen binding capacity of the erythrocyte, which increases towards lower temperature, thus erythrocytes cannot be used for oxygen transport at temperatures below 15° C. However, at low temperature non cellular perfusate fluid can take up oxygen and transport enough oxygen to cover tissue demand. (4) For normal cell metabolism interstitial fluid oxygen pressure should be between 20 to 60 mmHg, more precise 40 mmHG.

Thus, in a further embodiment of the present liver perfusion method, the perfusion start temperature with red blood cell or hemoglobin based perfusates is adjusted to temperatures between +4° C. and +25° C., more precisely at +10° C. The perfusate temperature is preferably increased by 0.1 to 10° C. per minute, more precise by 0.5° C. per minute. The arterial pressure may be kept at 40 mmHg with non-pulsatile flow until perfusate temperature reaches 20° C. Afterwards pulsatile flow can be switched on with systolic pressure 70-120 mmHg, more precisely 80 mmHg, diastolic pressure between 30 mmHg to 80 mmHg, more precisely 50 mmHg and a mean pressure between 50 to 90 mmHg, more precisely 60 mmHg. It is furthermore preferred, if the portal perfusion is regulated at a pressure between 0 mmHg to 5 mmHg, more precisely at 3 mmHg (pressure regulated) until perfusion temperature reaches 20° C. At temperatures higher than 20° C., portal perfusion is regulated with flow ranging between 500-2000 ml/min, more precisely 1000 ml/h (flow regulated). At temperatures between 4° C. and 25° C., more precisely less than 15° C., the oxygen delivery status and tissue oxygenation may be controlled with venous oxygen partial pressure and it should be kept between 30 mmHg to 60 mmHg, more precisely 40 mmHg. At temperatures higher than 20° C., oxygen delivery may be evaluated by venous blood saturation and it should be kept between 50% and 75%, more precisely 65%. Furthermore, during rewarming up to 20° C., the venous oxygen partial pressure is continuously measured with target values between 30 to 60 mmHg, more precise 40 mmHg during perfusion. If the partial pressure decrease in venous blood and when the value is below the targeted value, partial pressure of arterial and venous blood may be increased in a range between 100 to 750 mmHg. During rewarming at temperature higher than 20° C., the venous blood saturation may be controlled with target values between 50 to 75%, more precise 65%. If venous blood saturation decreases below the target value, portal blood saturation is increased.

Method for Stimulating Bile Production During Ex Vivo Liver Perfusion

Bile is produced by the liver and consists mainly of water (95%) as well as solid components including cholesterol, phospholipids, bile salts and other components (5%). Alongside its participation in digestion and hormonal homeostasis, bile serves as an important excretory route for potentially harmful substances. Bile acids are potentially toxic to cells and their concentrations are tightly regulated in vivo. The two primary bile salts are cholic acid, a trihydroxylated bile salt, and chenodeoxycholic acid (CDCA), a dihydroxy bile salt. These bile acids can be conjugated with either taurine or glycine and transported in bile ducts as mixed micelles consisting of bile salts, phospholipid and cholesterol.

Bile secretion is an energy dependent process with complex regulation mechanisms involving gastrointestinal hormones. In humans, bile production occurs in two locations, namely in hepatocytes and in the cells of the bile duct epithelium (also called cholangiocytes). In hepatocytes, bile production can either be dependent on or independent of bile salt concentration. Hence, the hepatocyte contribution to bile flow is divided into "bile salt dependent" bile flow and "bile salt independent" bile flow.

Figure 12:
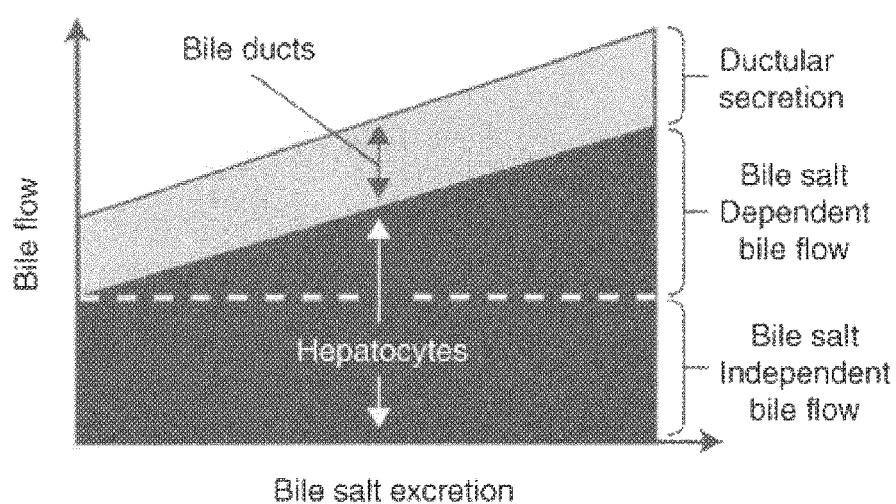

FIG. 12 illustrates bile, the flow determinants. It shows that a portion of the bile flow (as delimited by the white dashed line) is produced independently of bile salts. For the remaining hepatocyte bile flow, there is a linear relationship between bile salt excretion and bile flow. Cholangiocyte bile flow is constant. Human bile production is around 750 ml/24 h and can be equally divided into "bile salt dependent" (~250 mL/24 h), "bile salt independent" (~250 mL/24 h) and bile duct epithelium (~250 mL/24 h) parts. (Boyer J L. Bile formation and secretion. Compr Physiol. 2013; 3(3):1035-78.)

Several regulatory pathways exist for modulating bile production in hepatocytes and cholangiocytes.

Bile salt dependent bile flow is modulated by primary and secondary bile salts and their derivatives. Of those, Ursodeoxycholic acid is in clinical use to treat cholestasis. The related Nor-Ursodeoxycholic acid is currently in phase 2 and 3 clinical trials. Nor-Ursodeoxycholic (norUrsodeoxycholic) acid is relatively resistant to conjugation with glycine or taurine compared to Ursodeoxycholic acid and stimulates bicarbonate rich bile production. Bicarbonate rich bile production is important for cholangiocyte protection (Steinacher D, Claude) T, Trauner M. Therapeutic Mechanisms of Bile Acids and Nor-Ursodeoxycholic Acid in Non-Alcoholic Fatty Liver Disease. Dig Dis. 2017; 35(3): 282-7).

Bile salt independent bile flow is, amongst others, controlled by cholecystokinin, pancreasomin, glucagon, insulin and steroids.

Bile production in the bile duct epithelium is, amongst others, dependent on steroids, alkaline phosphatase (AP), secretin, somatostatin, gastrin, endothelin-1, bombesin, and vasoactive intestinal polypeptide (VIP). (3) For example, glucocorticoids enhance bile production through protein expression of apical Cl–/HCO3– exchangers and basolateral Na+/H+ exchange.

Continuous bile production during perfusion is considered as a marker of liver functionality and viability and is also required for elimination of toxic metabolic waste products. Furthermore, a reduced bile production is associated with biliary canaliculi damage, backed by histological evidence of cholestasis.

It is known that taurocholic acid is able to maintain the bile acid pool and, hence, to stimulate bile production with proven effectiveness in several studies. Although taurocholic acid can be sufficient for bile salt dependent bile flow, it is not approved for human use. The only medically approved bile acid is Ursodeoxycholic acid. It has been shown that both, Ursodeoxycholic acid and norUrsodeoxycholic, are potent stimulators of bile salt dependent bile flow in patients with cholestasis, but their application to stimulate bile production during ex vivo liver perfusion was never reported.

It was therefore another objective of the invention to provide a method for stimulating bile production during ex vivo liver perfusion.

Thus, in a further aspect of the invention a method for stimulating bile production during ex vivo liver perfusion, in particular using a perfusion loop assembly as described above, is provided, wherein at least one bile acid or at least one derivative thereof and/or at least one antimicrobial, antifungal and/or antiviral compound, at least one steroid and/or at least one hormone is administered to the perfusion loop assembly during ex vivo liver perfusion.

In one embodiment of the method the at least one bile acid or at least one derivative thereof, with the exception of sodium taurocholate, is administered for stimulating bile salt dependent bile flow during ex vivo liver perfusion. This can be done via a port (for example via the portal vein port for administering additives) or via a bolus.

The at least one bile acid or the at least one derivative thereof is selected from a group consisting of Ursodeoxycholic acid, norUrsodeoxycholic, Tauroursodeoxycholic acid, Glycocholic acid, Chenodeoxycholic acid, Cholic acid, Deoxycholic acid, Dehydrocholic acid, Chenodeoxycholic acid sodium salt, Sodium Cholate, Sodium Deoxycholate, Taurodeoxycholic acid sodium salt, Tauroursodeoxycholic acid sodium salt, Glycocholic acid sodium salt, Glycodeoxycholic acid sodium salt, Glycoursodeoxycholic acid, Ithocholic acid, Natural Taurine, Dihydroxy Propyltheophylline, Theophylline-7-acetic acid, Xanthinol Nicotinate. In particular Ursodeoxycholic acid and norUrsodeoxycholic are used as stimulants.

In yet a further embodiment of the method the at least one antimicrobial, antifungal and/or antiviral compound, at least one steroid and/or at least one hormone is administered for stimulating the bile salt independent bile flow and the cholangiocyte bile flow components during ex vivo liver perfusion. Piperacillinum (Piperacillinum-Natricum), Tazobactamum (Tazobactamum-Natricum), hormones like cholecystokinin, insulin, glucagon, any steroids (corticosteroids, in particular glucocorticoids, meniralocorticoids, sex steroids) and their derivatives are administered.

In still a further embodiment of the method the at least one bile acid or the at least one derivative thereof is administered in combination with the at least one antimicrobial, antifungal and/or antiviral compound, at least one steroid and/or at least one hormone. For example, it is in particular preferred to administer a combination of the at least one bile acid or the at least one derivative thereof with secretin.

In a further embodiment the at least one bile acid or the at least one derivative thereof and/or at least one antimicrobial, antifungal and/or antiviral compound, at least one steroid and/or at least one hormone is administered at any temperature (0-38° C.) as bolus or continuously.

The administering of the at least one bile acid or the at least one derivative thereof and/or at least one antimicrobial, antifungal and/or antiviral compound, at least one steroid and/or at least one hormone can be done at least twice within 24 hours, preferably at least three times within 24 hours.

In a yet further aspect a spectroscopic method for measuring cellular signal molecules, particularly FMN, NADH, ADH, succinate, xanthine and uric acide, in sanguineous or asanguineous perfusate during ex vivo organ perfusion is provided, wherein ischemic injury can be characterized in real time or non-real time.

It is furthermore possible to use real time fluorescence spectroscopy to detect FMN in sanguineous or asanguineous perfusate during ex vivo liver perfusion for characterizing ischemic injury.

Figure 10:
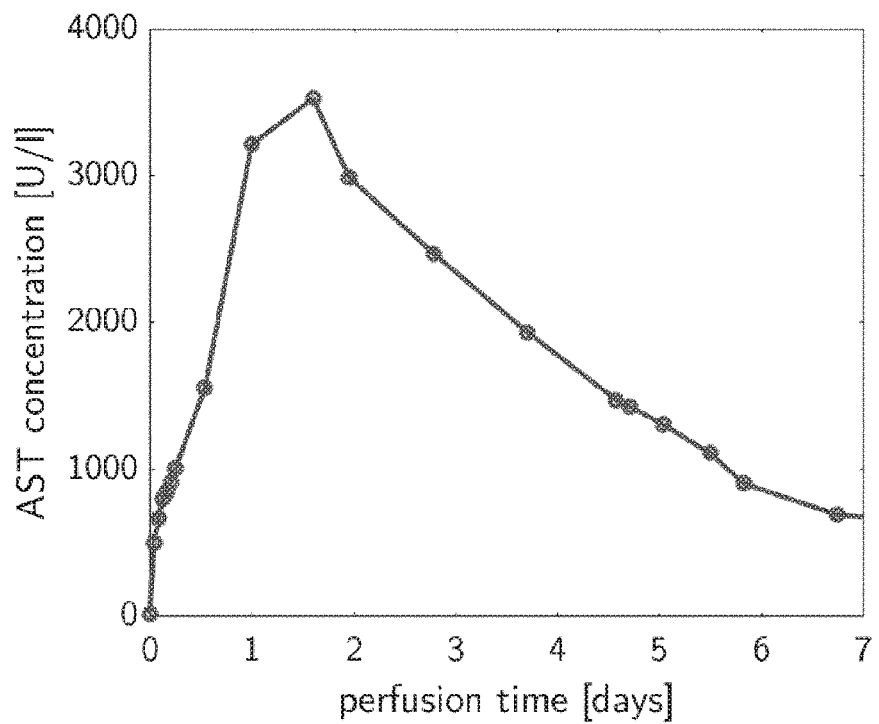
Figure 11:
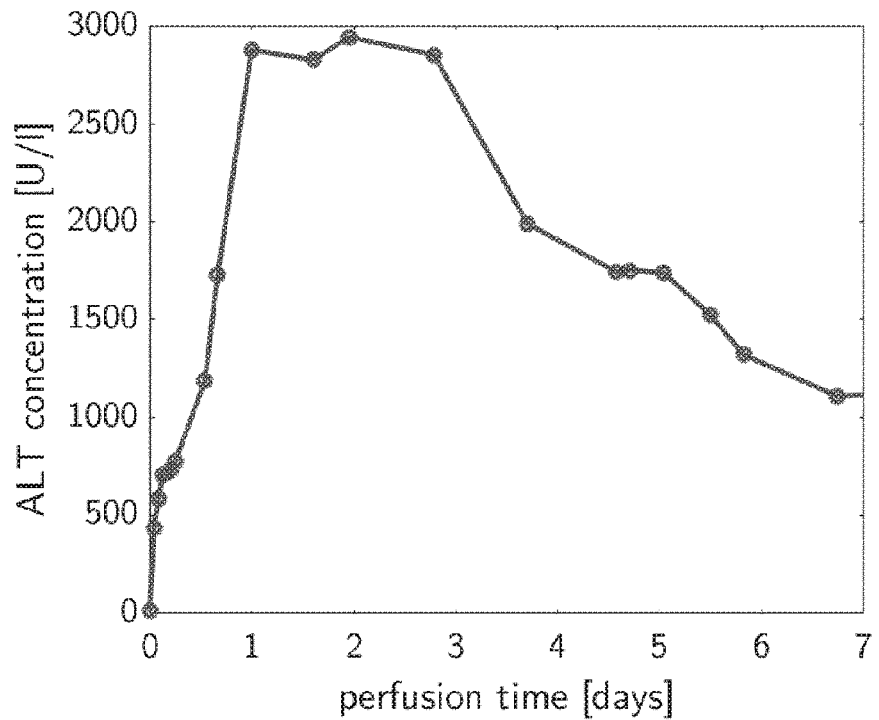

The embodiments are explained in more detail by means of several examples with reference to the figures. It shows:

FIG. 1A a first embodiment of a perfusion loop assembly;

FIG. 1B a second embodiment of a perfusion loop assembly;

FIG. 10 a third embodiment of a perfusion loop assembly;

FIG. 1D a schematic representation of a control loop mechanism, and

Figure 14:
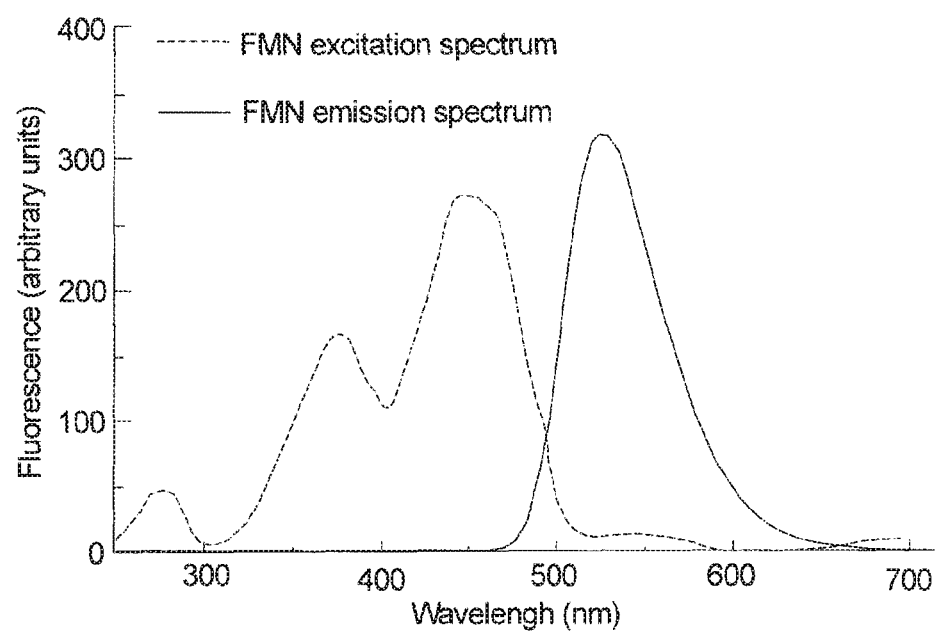
Figure 15:
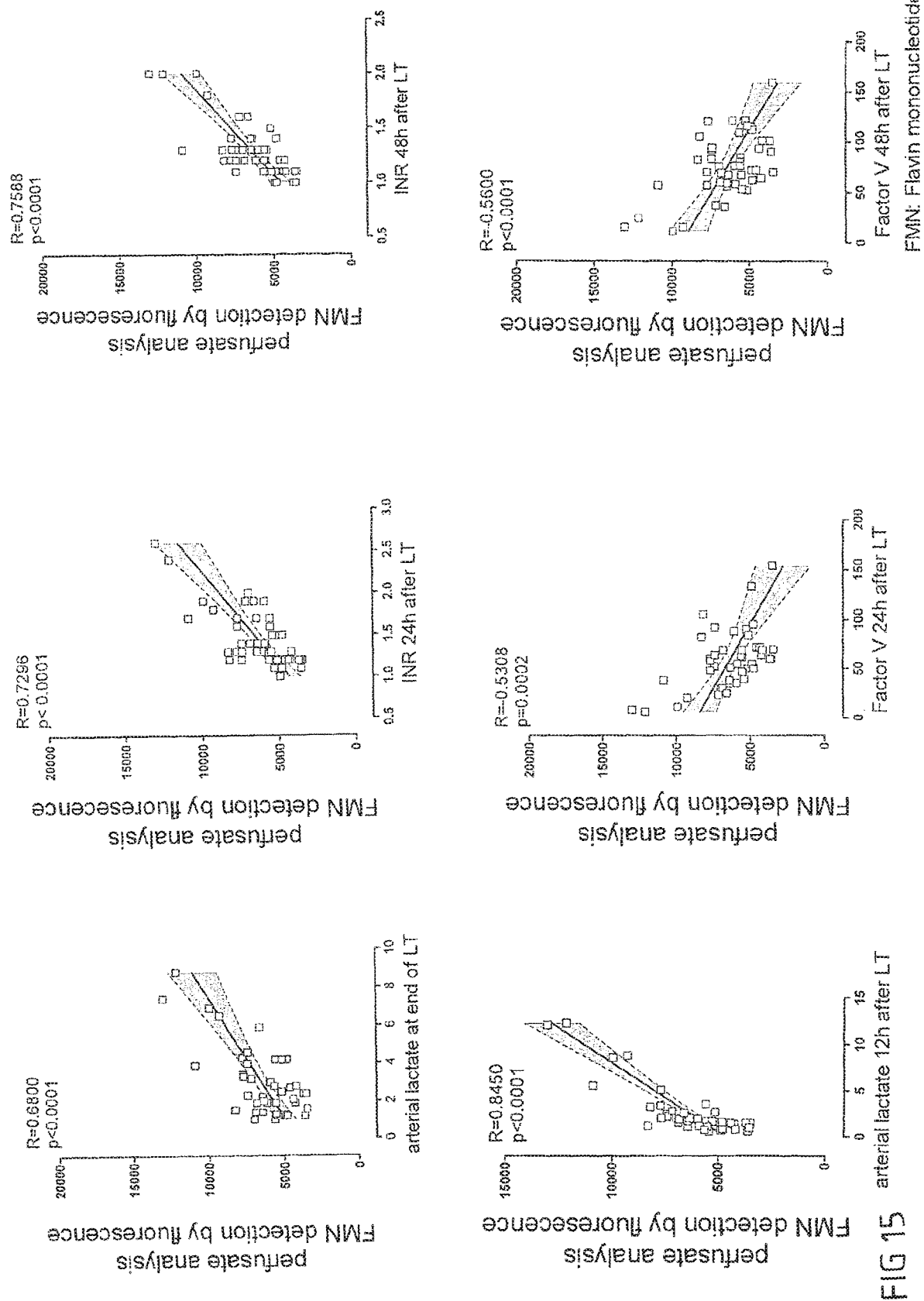

FIGS. 2-11 diagrams depicting different parameters monitored during liver perfusion, FIG. 12 a diagram illustrating bile flow determinants;

FIG. 13 diagrams of bile production stimulation during ex vivo liver perfusion;

FIG. 14 a diagram illustrating fluorescence excitation and emission spectra from FMN;

FIG. 15 diagrams illustrating the correlation of real-time fluorescence intensity of FMN at 30 min of ex-vivo perfusion of liver grafts with post-transplant early graft function.

FIG. 1A shows a first embodiment of the perfusion loop assembly comprising a pump 101 for keeping the perfusion medium flowing. Downstream from the pump 101 the line branches into a first branch line 110 and second branch line 120. The branching point 102 (e.g. a divider, connector) can be a mechanical device or a split in the line coming from the pump.

The first branch line 110 provides a first portion of the perfusion fluid to the hepatic artery (arteria hepatica propria or arteria hepatica communis) 111 of the liver which is here housed in a liver chamber assembly 130.

Here a gas exchanger 112, an oxygenator is arranged solely in the first branch line 110, i.e. hepatic artery branch. A flow sensor 114 is here measuring the fluid flow in the first branch line 110 upstream from the gas exchanger 112.

The second branch line 120 is configured to provide a second portion of the perfusion fluid to the portal vein (vena portae hepatis) 121 of the liver in the liver chamber assembly 130. The second branch line 120 is also comprising at least one valve 122 for controlling the flow of the perfusion fluid into the portal vein 121 of the liver in the liver chamber assembly 130.

The valve 122 is here a proportional pinch valve to adjust the flow into the portal vein 121. The proportional pinch valve 122 can be varied from fully open to almost or fully closed. Upstream from the valve 122 a flow rate sensor 124 measures the perfusion medium flow in the second branch line 120.

By progressively closing the proportional pinch valve 122, a constant total flow rate in the system can be maintained. The pressure in the hepatic artery inlet branch 110 could be varied over a large range by progressively closing the proportional pinch valve 122 and increasing the flow rate through this branch 110, thus reaching physiological values.

Pressure sensors 113, 123 measure the fluid pressure under ex vivo perfusion conditions in first branch line 110 (the hepatic artery 111 branch) and the second branch line (the portal vein 121 branch). The pressure sensors 113, 123 can be located in or close to the cannulation (not shown here) of the hepatic artery 111 and/or the portal vein 121. All pressure sensors should be preferably place on liver height to prevent corrections of the measured pressure values due to differences in height between liver and sensor chip.

The perfusion medium is collected through the liver outlet line 140 attached to the vena cava (vena cava inferior) 142 of the liver. A pressure sensor 141 measures the pressure under perfusion circulation, which can be located in or close to the cannulation (not shown here) of the vena cava inferior 142.

The outflow of the liver chamber assembly 130, i.e. the output of the vena cava 142 is directed to a reservoir 150 connected to the liver outlet line 140 and upstream from the pump 101. Therefore, it is possible to generate a closed perfusion loop. It is possible to have additional flow lines into the system (e.g. to make up for fluid losses) and out of the system (e.g. as purge streams).

A further pinch valve 141a is arranged downstream of the vena cava outlet 142 and upstream of the reservoir 150 in the vena cava outlet line 140. The pinch valve 141a allows to adjust the pressure at the vena cava outlet such that physiological pressure values resp. variations are generated in the vena cava as created e.g. by breathing. However, it is also possible to keep the pressure in the vena cava constant on the physiological level when using the pinch valve.

The connections of the lines 110, 120, 140 to the respective blood vessels 111, 121, 142 (hepatic artery, portal vein, vena cava) are made through cannulation, i.e. the ends of the lines 110, 120, 140 are constricted and inserted into the blood vessels 111, 121, 142. The cannulation is sealed by using surgical suture.

For the hepatic artery 111 liver inlet branch, 3/16" (0.00476 m, inner diameter) or 1/4" tubes are used. For the portal vein 121 liver inlet branch, 1/4" (0.00635 m, inner diameter) or 3/8" tubes are used. For the remaining tubes of the perfusion loop, 3/8" (0.00952 m, inner diameter) or 1/2" tubes are used. Differently sized and shaped connectors are used to connect the individual branches of the loop. The used connectors (flow divider, flow splitter, adapter) of the tube set are often equipped with Luer-Lock connection points where additional loops and injection or sampling points can be realized within the perfusion loop. For such loops, primarily extension lines resp. extension tubing (Type Heidelberger or infusion line) is used.

A port 115 for administering vasodilators and vasoconstrictors to the perfusion fluid in the first branch line is implemented in the first branch line 110 downstream of the at least one oxygenator 112 and downstream of the portal bypass 160.

A further port 125 for administering additives, in particular medication and/or nutrients except vasodilators and vasoconstrictors, to the perfusion fluid in the second branch line 120 is implemented in a parallel line to the second branch line. Said parallel line starts upstream of the valve 122 in the second branch line, passes the valve 122 and the bypass 160 between first and second branch line, and ends downstream of the at least one bypass 160.

The reservoir 150 is attached to the vena cava 142 liver outlet branch line 140. The reservoir 150 is attached at roughly the same height as the liver storage chamber, with an adjustable height setting (+/−50 cm). This can be adjusted (not shown here) by mechanical means to control the liquid head at the outlet of the liver (vena cava). The liquid level in the reservoir should be on the level of the liver outlet. However, this only applicable if the pinch valve 141a is completely open.

All tubing is kept as short as possible in order to minimize foreign surfaces. Moreover, the number of bendings and connectors in the perfusion loop should be minimized. Flow transition from laminar to turbulent in the perfusion loop should be avoided (acceleration and deceleration) to minimize hemolysis. The individual tube section lengths are in the range of 5 to 100 cm.

The length of the lines in the perfusion loop should be kept to a minimum in order to minimize the external surface in contact with the perfusion media.

A pump 101 (Thoratec, Centrimag or PediVAS, centrifugal pump) with almost linear pressure-flow characteristics was used to circulate the perfusion fluid.

Flow rate sensors 114, 124 (Sonotec, sonoflow CO.56) and pressure sensors 113, 123, 141 (PendoTECH single use pressure sensors) are integrated in the perfusion loop. The perfusion medium flow rates and pressures are measured in all liver line branches 110, 120, 140 (hepatic artery, portal vein, vena cava). Optionally, also the outflow of the liver can be measured by a flow rate sensor (Sonotec, sonoflow CO.56) in the branch line 140.

A bypass 160 between the first branch line 110 and the second branch line 120, wherein the bypass 160 connects the first branch line 110 downstream of the at least one oxygenator 112 with the second branch line 120. The bypass 160 between the first branch line 110 and the second branch line 120 comprises at least one valve 161, in particular at least one pinch valve, and at least one flow rate sensor 162 (see also FIG. 1B). The bypass 160 serves for adjusting the oxygen level in second branch line 120 (portal vein).

According to the embodiment depicted in FIG. 10 a bypass 163 between the first branch line 110 and the reservoir 150 is installed comprising at least one valve 164, in particular at least one pinch valve, and at least one flow rate sensor 165.

A dialysis machine 180 for adjusting the composition of the perfusion fluid, in particular for adjusting the hematocrit value, is provided, wherein the dialysis machine 180 is implemented between the liver outlet line 140 upstream of the reservoir 150 and the second branch line 120. Dialysis is required during ex vivo perfusion to correct electrolytes, remove waste products and to maintain the hematocrit level in the perfusion fluid in the physiological range.

The temperature of the perfusion medium is controlled by the built in heat exchanger of the oxygenator which is connected to an external recirculation chiller (not shown). The perfusion loop assembly is optimized to provide normothermic perfusion, which is at 37° C. for humans. In principle, the temperature range of the fluid in the perfusion fluid device is between 0° C. and normothermic conditions (e.g. 37° C.). The temperature is e.g. controlled through the chiller, which is controlled based on the temperature indication of a temperature sensor that measures temperature of the perfusate. By means of the built in heat exchanger, also continuous heating up or cooling down of the perfusate can be provided at every desired gradient (° C./min).

An insulation layer around the reservoir 150 or heating of the reservoir 150 may help to compensate for heat losses within the perfusion loop assembly, mostly originating from the exposed tubes.

Figure 2:
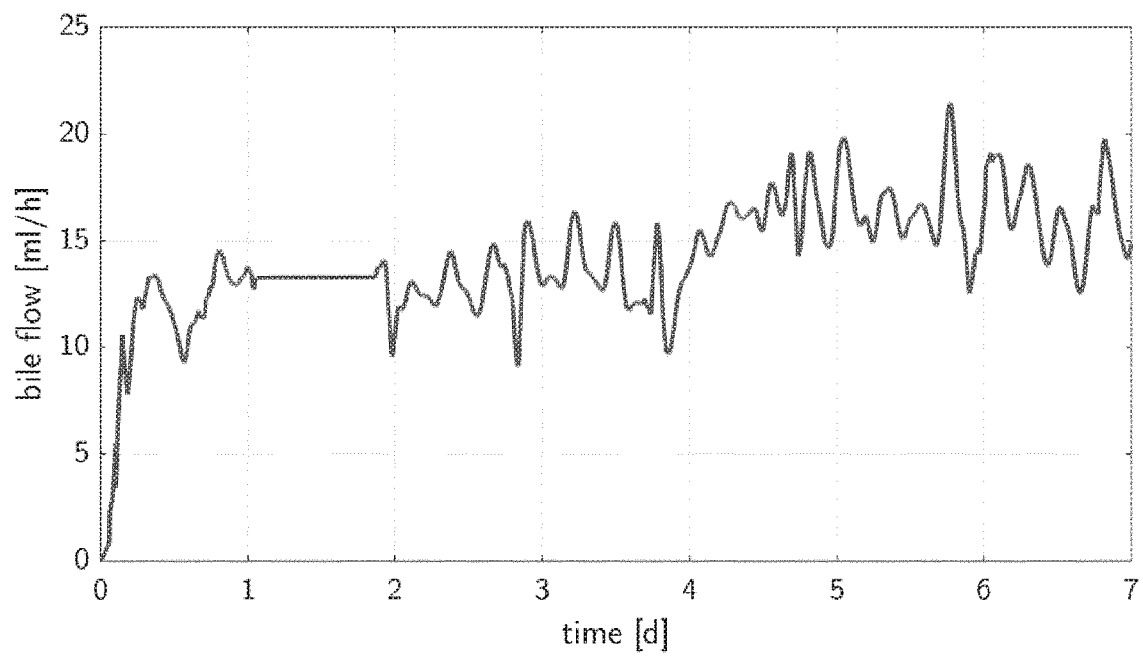

FIG. 2 shows a second embodiment of the perfusion loop assembly wherein in addition to the first embodiment shown in FIG. 1 additional sensor systems 116, 126, 146 are provided.

The first branch line 110 (hepatic artery line) and the second branch line 120 (portal vein line) are in each case connected to the sensors 116, 126, in particular a CDI sensor (Terumo Shunt Sensor), for monitoring the blood gases, in particular ($pCO_2$, $pO_2$), the pH-value and other components in the perfusion fluid. These values serve to calculate the oxygen saturation, bicarbonate concentration and base concentration in the respective line.

The sensor for monitoring physical quantities of interest of the perfusate in the hepatic artery line 110 is implemented in a line that runs parallel to the hepatic artery line, starts downstream of the oxygenator 112 at the hepatic artery line 110, then passes oxygenator 112, branching point 102, pump 101 and reservoir 150, and is connected to the vena cava line 140 upstream of the reservoir 150 or to the reservoir itself.

The sensor 126 for monitoring the composition of the perfusion fluid in the portal vein line 120 is implemented in a line connecting the portal vein line 120 (downstream of the valve 122 and the port 125 in the portal vein line 120) and the vena cava line 140 (liver outlet line) downstream of the valve 141a in the vena cava line 140. Alternatively, said sensor for monitoring the composition of the perfusion fluid in the portal vein line 120 can be implemented in a line connecting the portal vein line 120 (downstream of the valve 122 and the port 125 in the portal vein line 120) and the reservoir.

The liver outlet line 140 (vena cava line) comprises sensor 146 (a Terumo CDI cuvette) for monitoring the oxygen saturation $SO_2$, hemoglobin and hematocrit value in the perfusion fluid leaving the perfused liver. Said sensor 146 is implemented in the vena cava line 140 downstream of the pressure sensor 141 and upstream of the valve 141a for adjusting the pressure in the liver outlet line 140. Optionally, said sensor 146 can also be located downstream of valve 141a.

The ascites (comprising a liquid that is emitted or delivered from the outer surface of the liver) is transported from the liver chamber back to the perfusion fluid through line 190, which is connected to the liver outlet line 140 downstream of the valve 141a that adjusts the pressure in the liver outlet line 140. The line 190 can also be connected directly to the reservoir 150.

A device 191 for measuring and monitoring the continuous bile production is also provided. Device 191 allows for determining the total bile production and bile production rate instantaneously, at all times and for all times.

Generally, liver perfusion within the system described above can also be executed without cannulating the VC that results in a simplified and open perfusion loop assembly without vena cava line (140). Therefore, the pressure sensor(s) 141 and the pinch valve 141a are not part of the perfusion loop. In this case, a dedicated reservoir is not necessarily needed, because the liver chamber assembly (130) configured to hold the liver ex vivo can be used as reservoir to store the perfusate. The perfusate leaves the liver (100) through VC (142) and is collected in the liver chamber assembly (130). Finally, the perfusate is leaving this alternative reservoir (130) through the ascites line (190) or outlet line towards the suction side of the centrifugal pump (101). Due to the missing line (140) in this simplified embodiment, the sensor 146 (e.g. Terumo CDI 500 H/S Cuvette) can be integrated anywhere within the perfusion loop, preferably between liver chamber assembly (130) that acts as an alternative reservoir and the suction side of the centrifugal pump (101).

In FIG. 1D a cascaded control of the portal bypass is illustrated. Said cascaded control comprises an inner control loop and an outer control loop. The outer control loop comprises, in FIG. 1B Terumo CDI cuvette 146, flow sensor 162, and pinch valve 161, while the inner control loop comprises flow sensor 162 and pinch valve 161. Equivalently, for FIG. 1C, the outer control loop comprises Terumo CDI cuvette 146, flow sensor 165, pinch valve 164, while the inner control loop comprises flow sensor 165 and pinch valve 164. The outer control loop, which acts more slowly than the inner one, controls the oxygen saturation of the vena cava by varying the bypass flow set point. The bypass flow set point is then used as target bypass flow set point for the inner control loop, which then modifies the bypass flow rate by controlling the continuous pinch valve. In particular, if the flow rate through the said portal bypass is too high, the pinch valve clamps the tubing in order to increase the flow resistance and therefore decreasing the flow while, if the flow rate is too low, the pinch valve opens up to reduce the flow resistance in the portal bypass.

Example 1

The perfusion process typically proceeds in the following steps:
(1) The perfusion assembly is prepared according to an embodiment of the perfusion loop shown in FIGS. 1A-1C. In particular, the perfusion loop in this example comprises a pump 101 (Thoratec), an oxygenator 112 (Medos) with gas inlet, to which the gas ($CO_2$, $N_2$, $O_2$) flow rates are controlled via three gas flow controllers (Bronkhorst), with an inlet and outlet for heat exchanging fluid (liquid water) provided by a thermostat (Julabo), with a temperature indicator (TE Connectivity), an Infusion in: Vasoconstrictors/-dilators 115 and Infusion in (infusion pumps: Arcomed, syringe pumps: Arcomed), pinch-valves 122, 161, 141a, flow meters 162, 114, 124, pressure sensors 113, 123, 141 (PendoTECH), Dialysis machine (Fresenius) provided by a pump (not shown in Figure, Ismatec), glucose sensor 127 (C-CIT), lactate sensor (not shown in Figure, C-CIT), Terumo CDI Sensors 116, 126 (Terumo), CDI-Cuvette 146 (Terumo), bile collection bag, custom built liver chamber 130, custom made stainless steel cannulas for HA, PV, VC, bile, custom made soft-shell reservoir. Said custom made soft-shell reservoir and bile collection bag are, respectively, suspended from a hook connected to force sensors so as to monitor the weight of the reservoir and the collection bag over time. Said custom made built liver chamber is mounted to four force sensors so as to monitor the weight of the liver chamber over time. The blood lines are silicon tubing (Raumedic) and extension lines (Braun, Heidelberger). Three way stopcocks (not shown in Figure for the sake of clarity) with Luer-Lock sampling points are used for sampling perfusate during perfusion from lines 110, 120, 140, dialysis blood out and bile. In parallel, infusions according to the protocol below including medication, hormones and nutrients are prepared for administration at the beginning of and during perfusion through lines 125 or 115. All sensor probes are connected and calibrated (e.g. 114, 113, 141, 124, 123). The thermostat connected to the oxygenator (112) is initiated so as to reach desired temperature in 112 (resp. in the perfusate). Dependent on the perfusate, the dialysator is primed with dialysate solution, e.g. pumping from Dialysat In to Dialysat Out as shown in FIGS. 1A-1C. The flow rates between Dialysat In and Dialysat Out can be controlled differently via two independent channels of the roller pump in order to add or remove fluid from the perfusion loop.
(2) In this example, the perfusion loop is primed with a number of components prior to connecting the harvested liver organ: bolus medication and nutrients are administered to the system via a port upstream of the reservoir. Then the perfusate, in this example blood is used as explained in the following: fresh frozen plasma (FFP) and erythrocyte concentrate (EC). All relevant infusions are initiated. Platelets are added, when perfusate temperature is above 20° C.
(3) The liver is cannulated with cannulas in the HA, the PV, the VC and bile and connected to the tubing of the perfusion loop assembly directly in the liver chamber (130). This constitutes the actual begin of the perfusion. Key operating parameters such as pressure, flows, etc are given in the table below. The temperature over the entire perfusion time was 34° C., as measured in the indicator in the oxygenator.

| | | |
|---|---|---|
| Blood preparation | 1) 3 FFP + Heparin + 4 ECs | |
| | 2) Prime system and start circulation and dialysis; Administration of bolus medications | |
| | 3) Target HCT 30% | |
| | 4) Add bicarbonates 25 ml every 5-10 minutes until BE = −8 mmol/l. No correction if BE >−8 mmol/l | |
| | 5) Correct albumin after HCT reached 30%. Target albumin >3.0 | |
| | 6) Platelets only after rewarming above 20 C. | |
| Bolus at perfusion start | 1) Piperacillin-Tazobactam 2.25 g or Ertapinem 1 g (antibiotic) powder; Dissolve powder in 10 ml NaCl 0.9% | |
| | 2) Any steroids, in detail Solu-Medrol (Methylprednisolon) 500 mg; | |
| | 3) 10 ml Calcium Gluconate 10% after ACT measurement. | |
| | 5) 1 ml Konakion | |
| Med | Infusion Rate | |
| Sodium taurocholate or Ursodeoxycholic acid | Constant Infusion | 3.4 g (powder) in 24 ml NaCl 0.9% |
| Parenteral nutrition only with amino acids | Constant infusion | Amino acid bag of Nutriflex Special or other equivalent amino acids |
| Piperacillin-Tazobactam 2.25 g (antibiotic) + | Constant infusion | Fill syringe until 24 ml with NaCl 0.9% |

-continued

| | | |
|---|---|---|
| Solu-Medrol 500 mg (steroid) Alternatively continuous addition of any antibiotics or steroids | | |
| Bicarbonates | Automated | |
| Insulin | Automated | 0.15 mL in 40 ml NaCl 0.9% |
| Flolan (4 ug/ml) | Automated | Prepare 1 ug/ml solution |
| Phenylephrin | Automated | 2 ml (1 ml × 2) into 48 ml NaCl 0.9% |
| Heparin | Continuous | 1000 I.U/ml solvent Target ACT 200-300 s |
| Lipids | Continuous | |
| Carnitine | Constant infusion | 1 vial into 50 ml syringe and fill in up to 50 ml with glucose. |
| Glucagon | Automated | 1 i.U. Glucagon and add to perfusor syringe filled with 50 ml Glucose 5%. |
| Dialysis | Automated | Base excess and hematocrit control |
| Bolus infusion every 24 h. | On demand | |
| Flow protocol | | 1) Portal flow 750-1300 ml/min adjustable depending on arterial flow |
| | | 2) Pulsatile arterial flow with target 40-60/70-90 mmHg. |
| | | 3) Start Flolan to maintain arterial flow (automated) |
| | | 4) Start Phenylephrin to maintain arterial flow (automated) |
| Optional: Ramp up protocol | | 1) Perfusion start at 10° C., rewarming 0.5-1.5° C./min, control with vSO2 |
| | | 2) Perfusion pressure <20° C.: HA = 40 mmHg, PV <3 mmHg |
| | | 3) Perfusion pressure 20° C. to 30° C.: HA = 60 mmHg, PV <5 mmHg |
| | | 4) Perfusion pressure >30° C.: HA Pulsatile 50 mmHg/80 mmHg, PV 1 L/min |

(4) The above protocol is realized in the following manner: key physical and physiological parameters are adjusted to the desired range by the controllers. Periodically, depleted infusion syringes require to be replaced. Typically, the liver organ can be kept in a viable state over an extended period of time, typically for 7 to 10 days as shown in this example (see figures below). In particular, key parameters can be kept in a range close to the physiological one (see figures below). Typical time evolution of key parameters over a perfusion time of 7 days is shown below. For example, bile production of the liver during perfusion time is frequently used as an important indicator for the metabolic activity of the liver. As shown in FIG. 2, bile was produced at a rate of 14 ml/h on average or over the entire duration of the perfusion.

Figure 3:
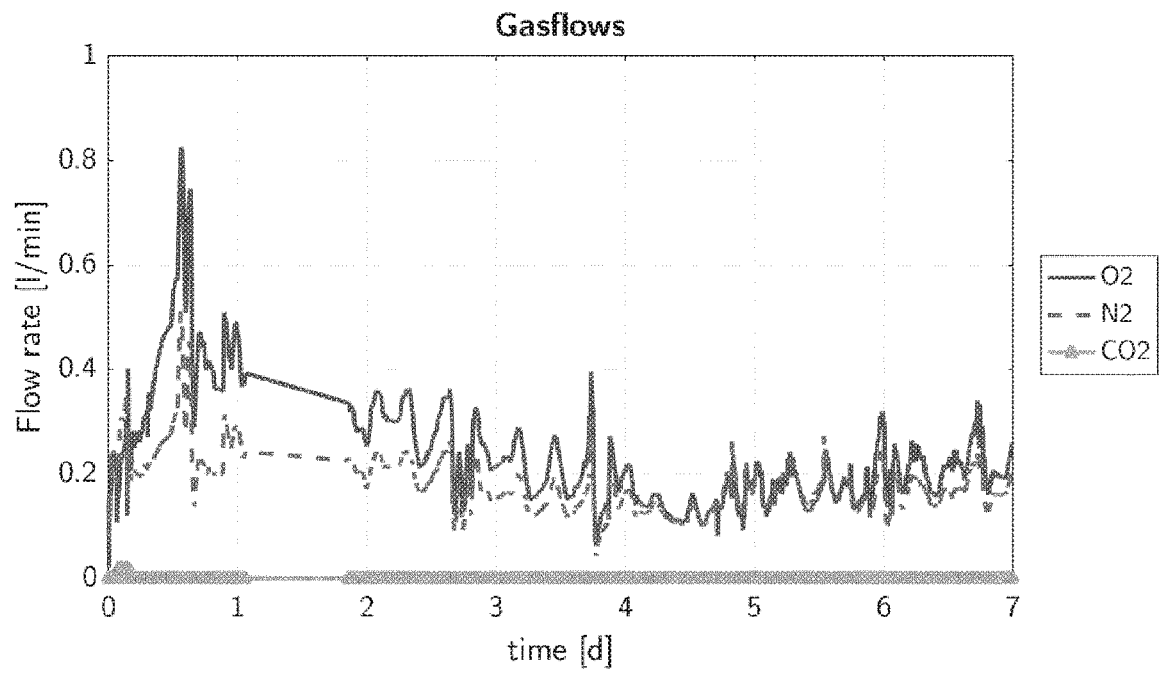
Figure 4:
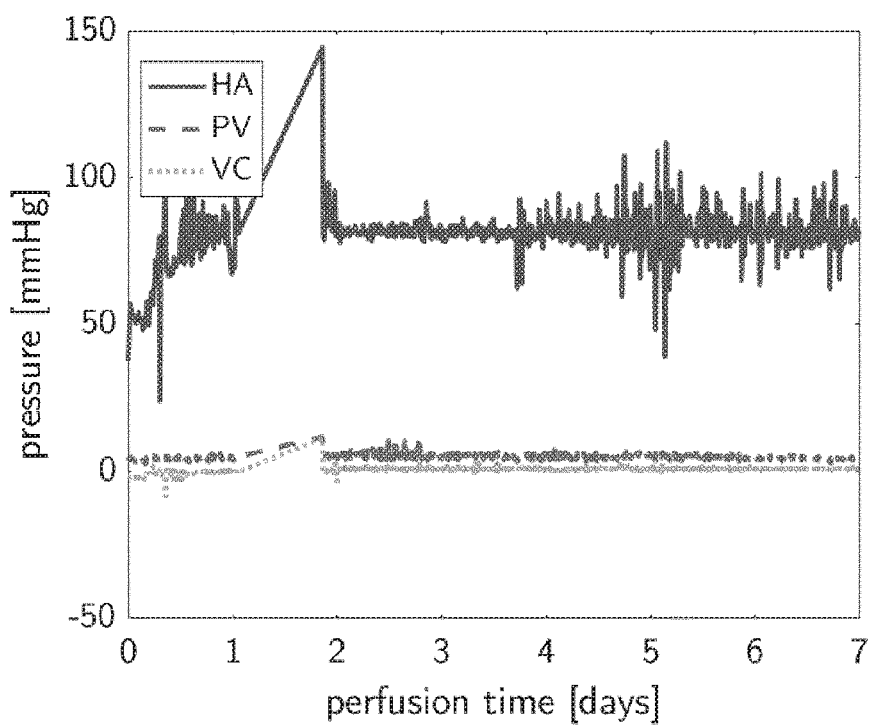
Figure 5:
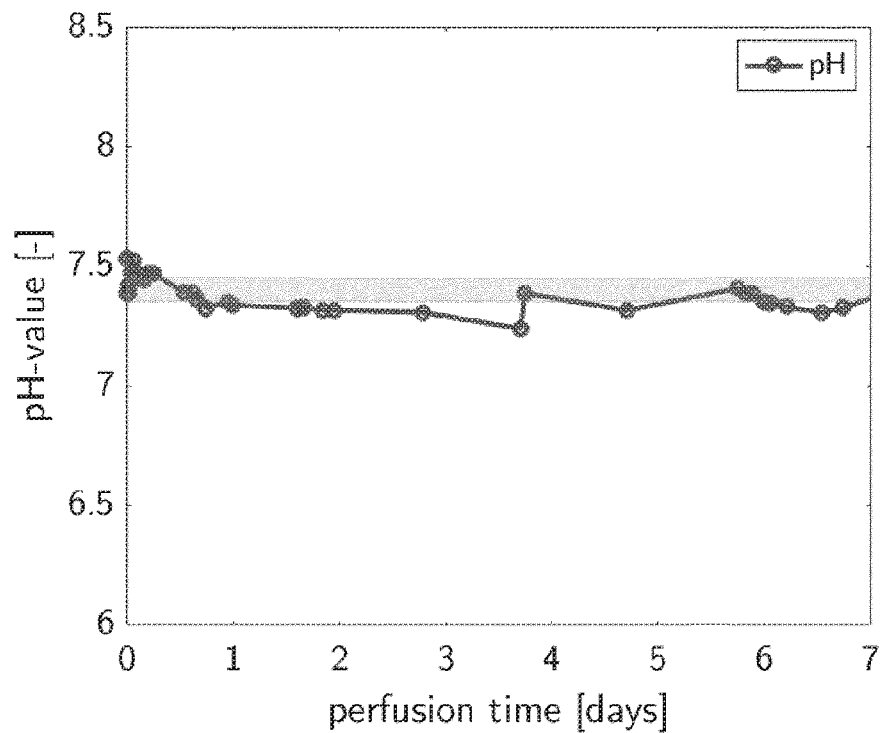
Figure 6:
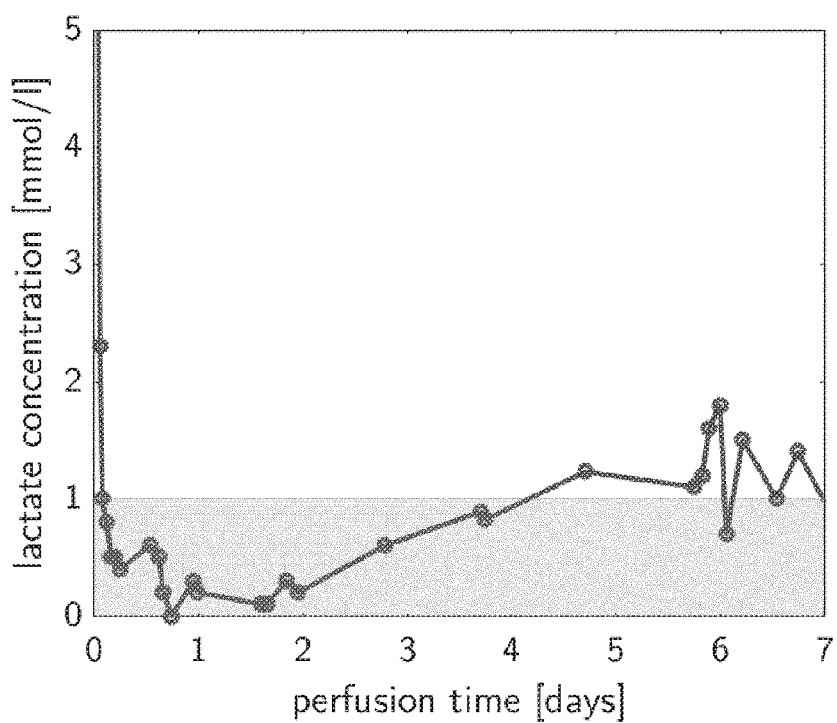
Figure 7:
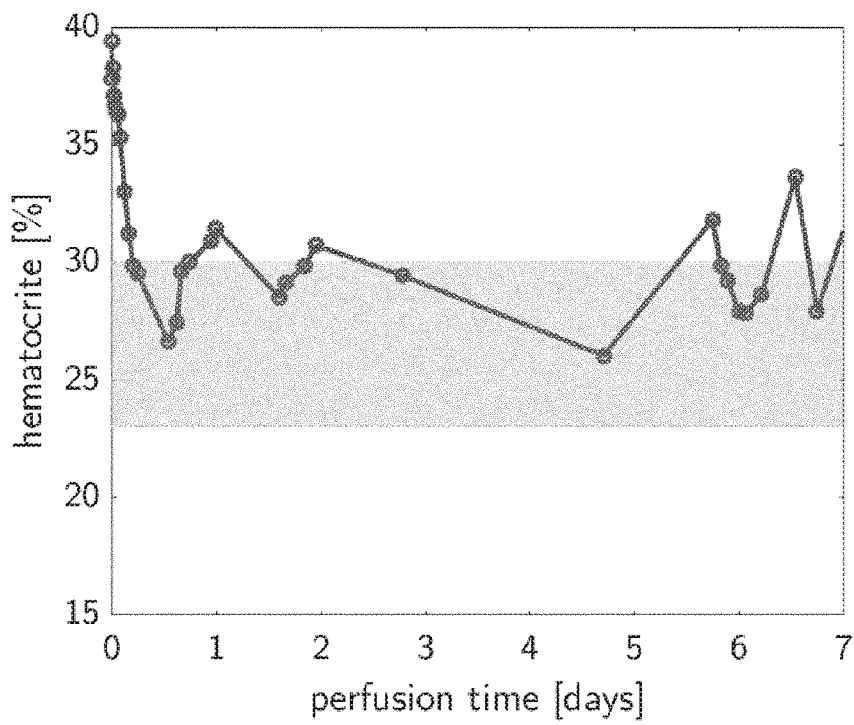
Figure 8:
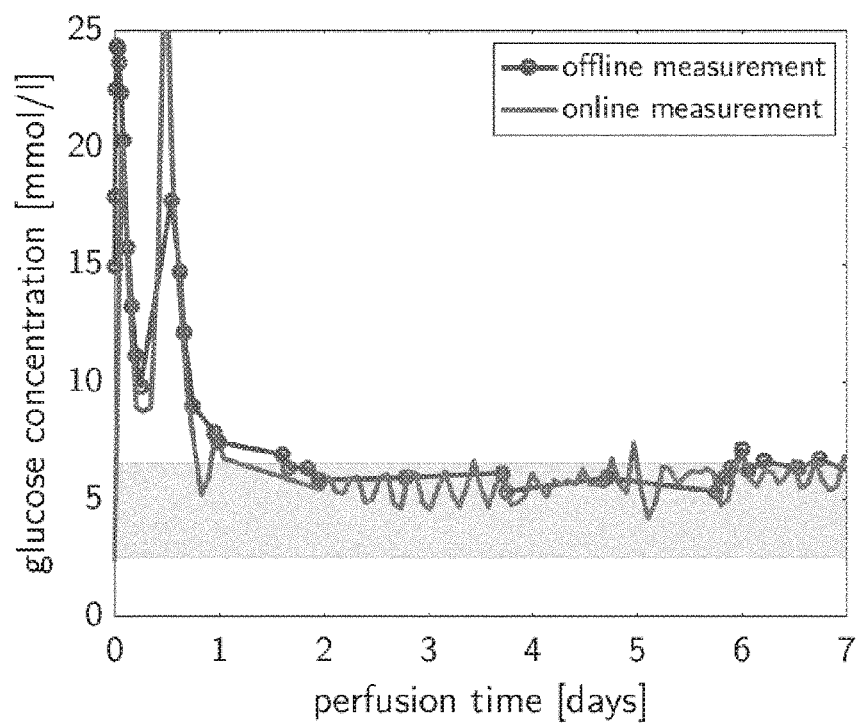
Figure 9:
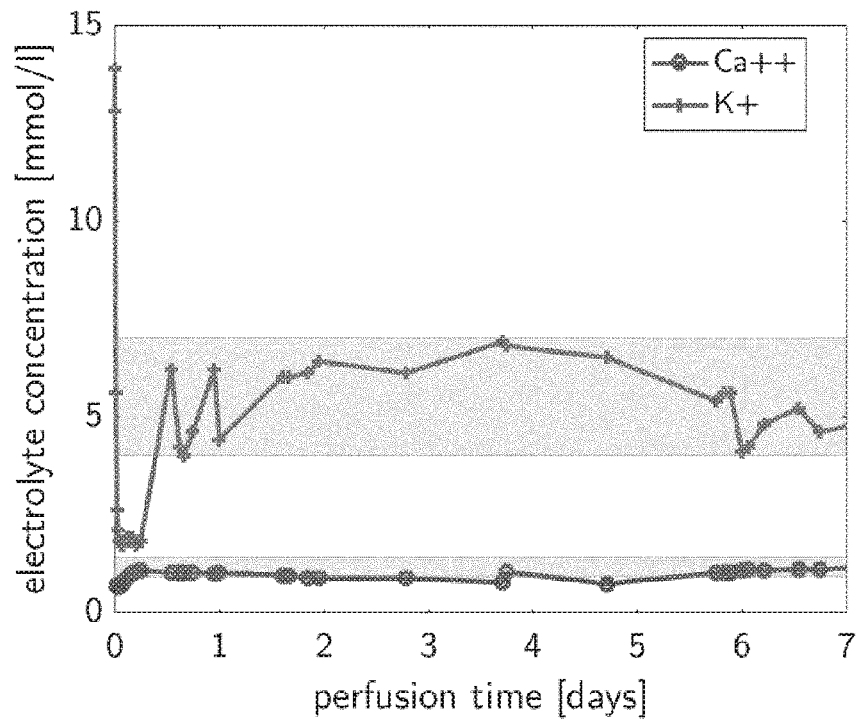

Gas flow rates of the individual gas species provided as a mixture to the oxygenator are shown in FIG. 3.

Further characteristic indicators of the viability of the liver (as pressure, pH value, lactate concentration, hematocrit value, glucose, electrolyte, AST (Aspartate transaminase), ALT (Alanine transaminase) are shown in the diagrams of FIGS. 4-11. Notes to FIGS. 4-11—: unless otherwise stated the quantities shown on the vertical axis concern quantities in the perfusate, i.e. in this example blood. The shaded areas in the figures correspond to the physiological ranges.

Figure 13A:
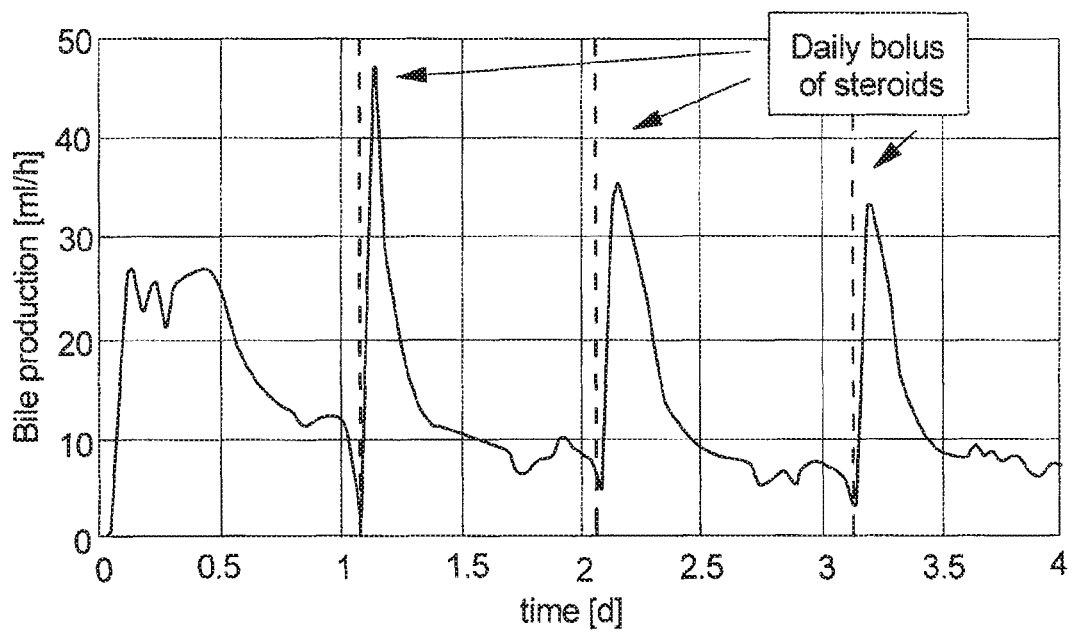
Figure 13B:
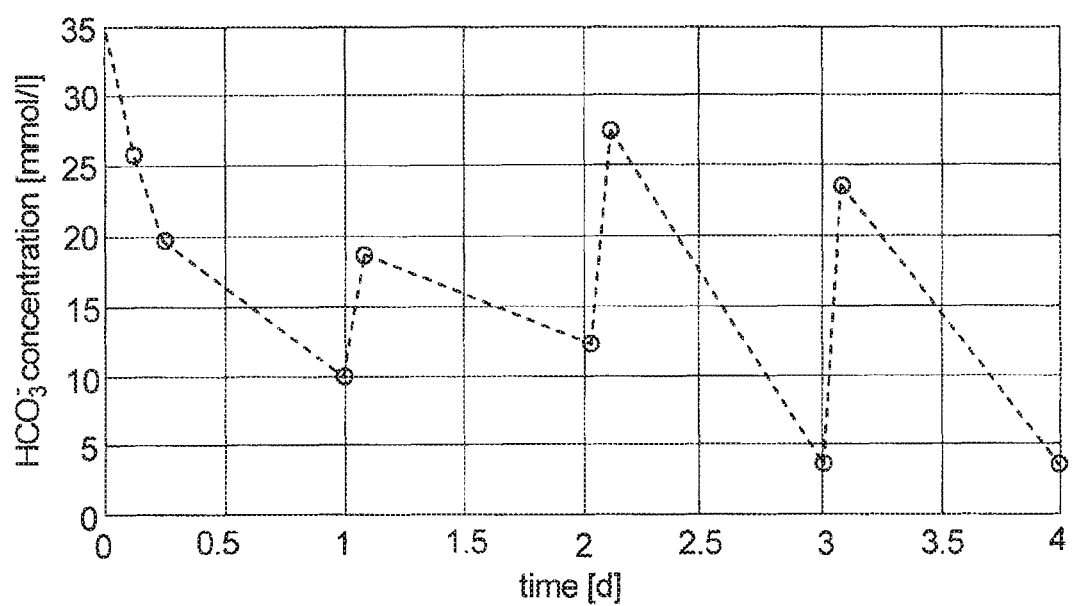
Figure 13C:
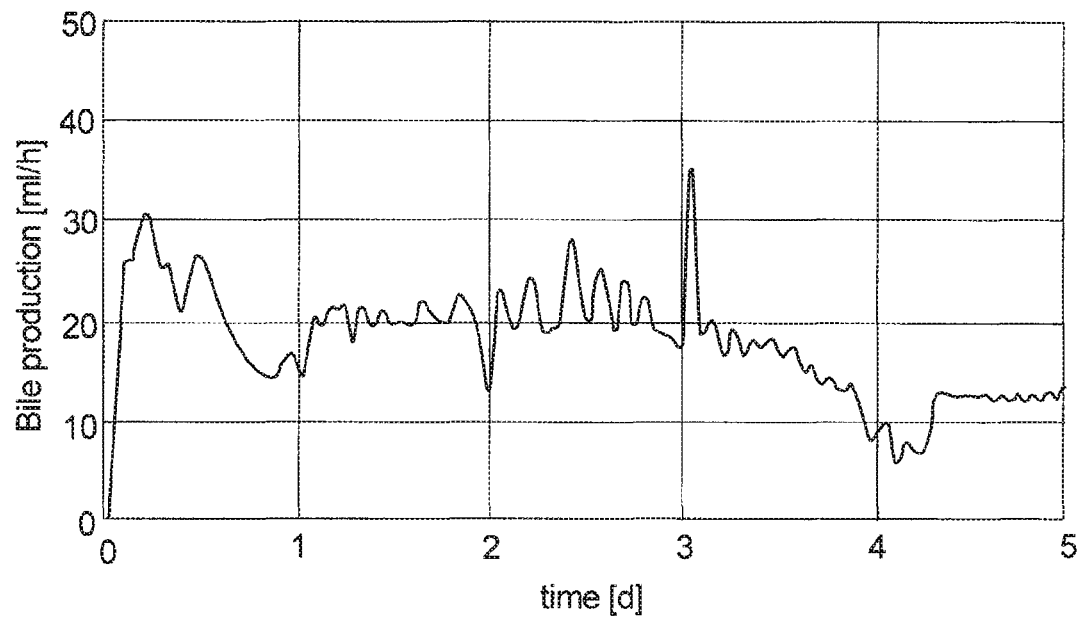
Figure 13D:
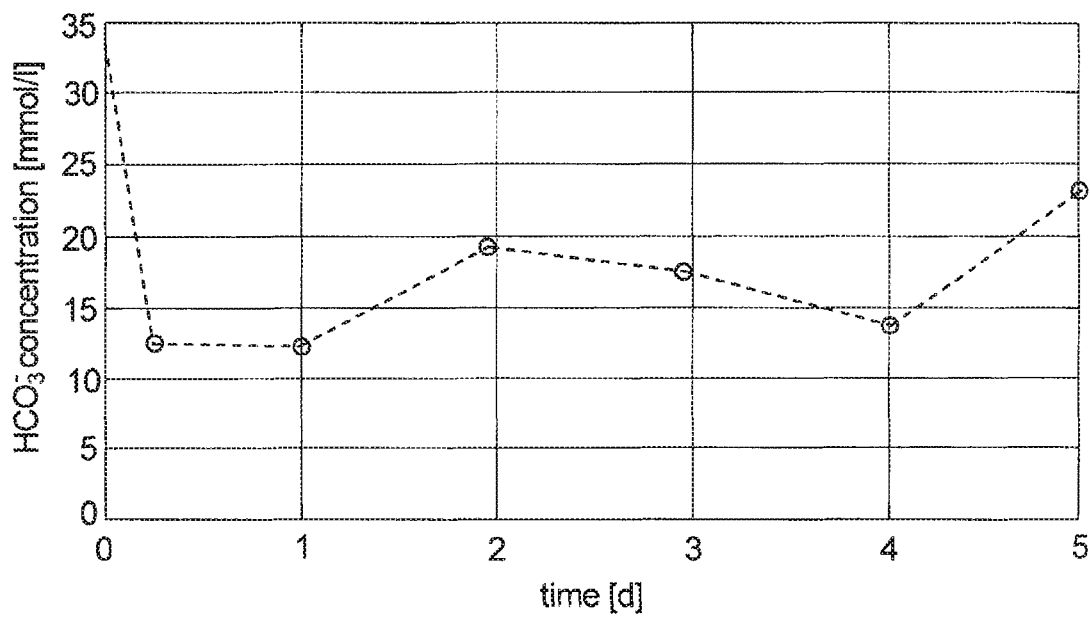

FIG. 13 shows diagrams of bile production stimulation during ex vivo liver perfusion after steroid and antimicrobial addition (FIG. 13A: bile flow versus perfusion time and FIG. 13B bicarbonate concentration in bile versus perfusion time). In FIG. 13A and FIG. 13B, a spike in bile flow and bicarbonate concentration, respectively, is observed upon daily bolus addition of steroids and antimicrobials. FIG. 13C and FIG. 13D show bile production and bicarbonate concentration versus time for continuous steroid and antibiotic addition.

The bile production during perfusion experiments was explored using pig livers. Despite continuous Sodium Taurocholate substitution, bile production decreased over the time, indicating missing bile salt independent bile flow and cholangiocyte bile production activation. Indeed, administration of steroids (Solu-Medrol) lead to a spike in bile flow during perfusion, as shown in FIG. 13A.

Piperacillinum (Piperacillinum-Natricum) and Tazobactamum (Tazobactamum-Natricum) addition can be used to stimulate bile production. The same effect can be observed with addition of some other antimicrobials (Invanz, Ertapinem). Continuous administering of steroids and antibiotics during perfusion lead to continuous bile production (see FIG. 13C).

| Notation | |
|---|---|
| A | Arterial |
| AC | Ascites |
| ACT | Activated clotting time |
| ALT | Alanine transaminase |
| AST | Aspartate transaminase |
| CK7 | Cytokeratin 7, used for cell staining |
| DBD | donation after brain death |
| DCD | donation after cardiac death |
| EC | erythrocyte concentrate |
| FAD | flavin adenine dinucleotide |
| FFP | freshl frozen plasma |
| FMN | flavin mononucleotide |
| GGT | Gamma-glutamyltransferase |
| HA | Hepatic artery |
| IU | International unit |
| LDH | Lactate dehydrogenase |
| Ki-67 | Antigen KI-67, used for cell staining |
| mmHg | millimeter of mercury |
| NAD | Nicotinamid-Adenin-Dinukleotid |
| NADH | Nicotinamidadenindinukleotid-Dehydrogenase |
| $PaCO_2$ | Arterial partial pressure of carbon dioxide |
| $PCO_2$ | Partial pressure of carbon dioxide |
| $PaO_2$ | Arterial partial pressure of oxygen |
| $PvO_2$ | Venous partial pressure of oxygen |
| $PO_2$ | Partial pressure of oxygen |
| PV | Portal vein |
| ROS | Reactive Oxygen Species |
| $SO_2$ | oxygen saturation |

-continued

| Notation | |
|---|---|
| TG | Triglyceride |
| v | Venous |
| VC | Vena cava |
| vSO$_2$ | venous oxygen saturation |

Example 2

Online Fluoroscopic Measurement of Mitochondrial Complex I Fragment Flavin Mononucleotide (FMN) During Ex-Vivo Organ Perfusion to Predict Post-Transplant Function (Outcome)

To measure fluorescence of FMN, a fluorescence flow cell comprising a light probe and a receiver probe placed at 90° (e.g. Ocean Optics Inc, Avantes, . . . ), is integrated into the perfusion loop, preferably at after the outflow of the organ. In detail, the light probe is connected to a halogen lightsource to emit monochromal light at wavelength 445 nm (or 373 nm) on the circulating perfusate. The spectrometric receiver probe with sufficiently high resolution (e.g. 4.6 nm) is used to quantify the proportion of emitted fluorescent light by the FMN molecule. The fluorescence emission maximum of FMN is measured between 500-600 nm, more precisely at 525 nm. Fluorescence excitation and emission spectra from FMN is shown in FIG. 14, The spectrometer can be operated in "kinetic" mode, which allows the continuous and real-time measurement of the fluorescence intensity of FMN during perfusion.

Fluorescent measurement can be easily performed in asanguinous machine perfusate, for example Belzer MPS© UW Machine Perfusion Solution (Bridge To Life) but the measurement is also possible when sanginous perfsuate, e.g. full blood or white blood cell depleted blood, is used. During ex-vivo machine perfusion of the graft, fluorescence intensity of FMN is continuously measured and the peak intensity, for example at 30 min, is used as predictor of post-transplant graft function. The signal intensity can be quantified by a calibration curve which can be obtained by measuring signal intensity at different concentrations of synthetic FMN. Then the signal intensity obtained during ex vivo perfusion FMN measurement according to the described method can be quantified using the calibration curve. Therefore, it is possible to measure the FMN concentration in the perfusate. In the case of human liver transplantation, the lower the fluorescence intensity at 30 min (low level of FMN released), the better the synthetic function of the liver graft during the first 48 h after transplantation.

Aside from the release of FMN during perfusion, a variety of other signature molecules of graft quality are released and can be detected, namely Xanthine, Hypoxanthine, Succinate, Xanthosine, Nicotinic Acid, Nicotinamide Adenine Dinucleotide (NAD/NADH), Flavin Adenine Dinucleotide (FAD/FADH), Inosine, Inosine-5"-monophosphate, 8-hydroxyguanosine, Uric acid, Biliverdin, Protoporphyrin, Purine, Riboflavines, Uracil, Uridine, 8-Hydroxyguanosine, adenosine tri-phosphate, adenosine-di-phosphate, Malonate, Pyruvate, Aconitate, Fumarate, Malate, Aspartate, Citrate, Aconitate, Adenine, Propionylcarnitine, Choline, Lactate, Proline, Leucine, Tryptophan, Phenylalanine, Tetramethylrhodamine, Adenosindiphosphat (ADP), Adenosintriphosphat (ATP), Creatine, N-Acetyl-L-glutamic acid in the perfusate. These molecules are measured and monitored by spectroscopic methods, e.g. nuclear magnetic resonance spectroscopy analysis of the perfusate at different time points during perfusion. This data, together with the FMN measurement and functional tests (bile production, coagulation), will further improve the assessment of the liver graft hereby improving post-transplant survival of the recipients.

FIG. 15 shows the correlation of peak intensity of FMN after 30 min of perfusion with the main indicators of liver function, namely arterial lactate clearance, INR (international normalized ratio) and factor V, in transplanted human livers.

REFERENCE NUMBERS 100 liver
101 pump
102 flow divider, connector, flow splitter (only explicitly indicated connector)
110 first branch line (hepatic artery)
111 hepatic artery vessel
112 first oxygenator, gas exchanger including heat exchanger
113 first pressure sensor
114 first flow rate sensor
115 hepatic artery port for administering additives
116 perfusion fluid parameters monitoring sensor, e.g. Terumo CDI510H shunt sensor
120 second branch line (portal vein)
121 portal vein vessel
122 first valve, first pinch valve
123 second pressure sensor
124 second flow rate sensor
125 portal vein port for administering additives
126 perfusion fluid parameters monitoring sensor, e.g Terumo CDI510H shunt sensor
127 glucose, ammonium and or lactate sensor
130 liver chamber assembly
140 outlet line
141 third pressure sensor
141a vena cava pinch valve
142 vena cava vessel
146 perfusion fluid parameters monitoring sensor, e.g. Terumo CDI 500 H/S Cuvette
150 reservoir (hardshell or softshell)
160 bypass from hepatic artery branch to portal vein branch
161 bypass valve
162 bypass flow rate sensor
163 bypass from hepatic artery branch to reservoir
164 bypass valve
165 bypass flow rate sensor
180 dialysis machine (main components: dialysis filter, 2 roller pumps for dialysate)
190 line for ascites
191 bile device

The invention claimed is:

1. A perfusion loop assembly for perfusion of an ex vivo liver, comprising:
    a pump and a line, wherein the pump is configured to provide a fluid flow of a perfusion fluid through the line and wherein the line branches at a branching point into a first branch line and a second branch line downstream of the pump;
    the first branch line being configured to provide a first portion of the perfusion fluid to the hepatic artery (arteria hepatica propria or arteria hepatica communis) of the ex vivo liver;

the first branch line being coupled with a first gas exchanger, wherein the first branch line comprises a port for administering additives to the perfusion fluid in the first branch line;

wherein the first branch line comprises a flow rate sensor and a pressure sensor, the second branch line being configured to provide a second portion of the perfusion fluid to the portal vein (vena portae hepatis) of the ex vivo liver;

the second branch line further comprising a first valve for controlling the flow of the perfusion fluid into the portal vein of the ex vivo liver, wherein the second branch line comprises a port for administering additives to the perfusion fluid in the second branch line;

wherein the second branch line comprises a flow rate sensor and a pressure sensor;

a liver chamber assembly configured to hold the ex vivo liver, a liver outlet line configured to be attached to the vena cava (vena cava inferior) of the ex vivo liver, the outlet line further comprising a second valve for adjusting the pressure in the outlet line at the vena cava of the ex vivo liver, wherein the outlet line comprises a pressure sensor, a reservoir connected to the outlet line and upstream from the pump, a bypass between the first branch line and the second branch line, wherein the bypass connects the first branch line downstream of the gas exchanger with the second branch line downstream of the first valve, or a bypass between the first branch line and the reservoir, and a dialysis machine for adjusting the composition of the perfusion fluid, wherein the dialysis machine is implemented between the outlet line upstream of the reservoir and the second branch line.

2. The perfusion loop assembly according claim 1, wherein at least one of:
  the first branch line, the second branch line and/or the outlet line comprise an interface with the hepatic artery of the ex vivo liver, the portal vein and/or the vena cava, respectively, and
  the first branch line and the second branch line are connected to a sensor for monitoring blood gases.

3. The perfusion loop assembly according to claim 1, wherein the outlet line comprises a sensor for monitoring the oxygen saturation $SO_2$, hemoglobin and hematocrit value in the perfusion fluid.

4. The perfusion loop assembly according to claim 1, wherein the first valve in the second branch line is a proportional pinch valve.

5. The perfusion loop assembly according to claim 1, wherein at least one of:
  the port for administering additives in the first branch line is implemented in the first branch line downstream of the gas exchanger and downstream of the bypass, and
  the port for administering additives to the perfusion fluid in the second branch line is implemented in a parallel line to second branch line.

6. The perfusion loop assembly according to claim 1, wherein a sensor for monitoring the glucose level and/or a sensor for monitoring the lactate level and/or a sensor for monitoring the ammonium level in the perfusion fluid is implemented in the loop assembly.

7. The perfusion loop assembly according to claim 1, wherein a spectroscopic flow cell for recording fluorescence and/or absorbance spectra of at least one compound or molecule present in the perfusate is implemented in the loop assembly.

8. The perfusion loop assembly according to claim 1, wherein a valve and a flow rate sensor are implemented in the bypass between the first branch line and the second branch line.

* * * * *

UNITED STATES PATENT AND TRADEMARK OFFICE
CERTIFICATE OF CORRECTION

PATENT NO. : 12,225,900 B2  
APPLICATION NO. : 16/962531  
DATED : February 18, 2025  
INVENTOR(S) : Dustin Becker et al.

Page 1 of 1

It is certified that error appears in the above-identified patent and that said Letters Patent is hereby corrected as shown below:

On the Title Page

Column 1, Item (72) Inventors, Lines 10-11, delete "Zurich Zurich" and insert -- Zurich --

In the Specification

Column 1, Line 4, below "METHOD FOR EX-VIVO LIVER PERFUSION" insert -- CROSS-REFERENCE TO RELATED APPLICATIONS
This application is the United States national phase of International Application No. PCT/EP2019/051252 filed January 18, 2019, and claims priority to European Patent Application Nos. 18 152 562.7 filed January 19, 2018, 18 169 518.0 filed April 26, 2018, and 18 204 583.1 filed November 6, 2018, the disclosures of which are hereby incorporated by reference in their entirety. --

In the Claims

Column 35, Line 1, Claim 1, before "gas" delete "first"

Column 35, Line 23, Claim 1, before "outlet" insert -- liver --

Column 35, Line 27, Claim 1, before "outlet" insert -- liver --

Column 35, Line 37, Claim 1, before "outlet" insert -- liver --

Column 36, Line 4, Claim 2, before "outlet" insert -- liver --

Signed and Sealed this  
Twenty-second Day of April, 2025

Coke Morgan Stewart  
*Acting Director of the United States Patent and Trademark Office*